United States Patent
Jones et al.

(10) Patent No.: US 12,350,613 B2
(45) Date of Patent: *Jul. 8, 2025

(54) LIQUID FILTRATION MEDIA, FILTER ELEMENTS AND METHODS

(71) Applicant: Donaldson Company, Inc., Bloomington, MN (US)

(72) Inventors: Derek O. Jones, Andover, MN (US); Keh B. Dema, Johnson City, TN (US); Stephen M. Larsen, Inver Grove Heights, MN (US); Mike J. Madsen, Chaska, MN (US); Andrew J. Dallas, Lakeville, MN (US); Yehya A. Elsayed, St. Paul, MN (US); Chuanfang Yang, Eden Prairie, MN (US)

(73) Assignee: Donaldson Company, Inc., Bloomington, MN (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/094,029

(22) Filed: Jan. 6, 2023

(65) Prior Publication Data

US 2023/0226475 A1 Jul. 20, 2023

Related U.S. Application Data

(63) Continuation of application No. 16/298,000, filed on Mar. 11, 2019, now Pat. No. 11,565,206, which is a
(Continued)

(51) Int. Cl.
*B01D 39/20* (2006.01)
*B01D 39/18* (2006.01)

(52) U.S. Cl.
CPC ......... *B01D 39/2024* (2013.01); *B01D 39/18* (2013.01); *B01D 2201/18* (2013.01)

(58) Field of Classification Search
None
See application file for complete search history.

(56) References Cited

U.S. PATENT DOCUMENTS

| RE28,102 E | 8/1974 | Mayhew |
| 3,849,241 A | 11/1974 | Butin et al. |
| (Continued) |

FOREIGN PATENT DOCUMENTS

| CA | 2087773 | 7/1993 |
| CA | 2821528 | 5/2006 |
| (Continued) |

OTHER PUBLICATIONS

"Communication Pursuant to Article 94(3) EPC," for European Patent Application No. 16154980.3 mailed Feb. 23, 2023 (4 pages).
(Continued)

*Primary Examiner* — Benjamin M Kurtz
(74) *Attorney, Agent, or Firm* — Pauly, DeVries Smith & Deffner LLC

(57) ABSTRACT

A filter and filter media configured and arranged for placement in a fuel stream is disclosed. The filter and filter media allow for filtering of liquid fuels, such as diesel fuel. In certain embodiments the filter media includes a media fiber (such as glass) and a binder fiber (such as bicomponent) that combine to create a media structure having low solidity and relatively low compressibility, and which contain a pore structure that avoids premature fouling of the filter by fuel degradation products.

19 Claims, 13 Drawing Sheets

Related U.S. Application Data continuation of application No. 14/717,854, filed on May 20, 2015, now Pat. No. 10,226,723, which is a continuation of application No. 13/027,119, filed on Feb. 14, 2011, now Pat. No. 9,056,268.

(60) Provisional application No. 61/304,232, filed on Feb. 12, 2010.

(56) References Cited

U.S. PATENT DOCUMENTS

| | | |
|---|---|---|
| 3,855,046 A | 12/1974 | Hansen et al. |
| 3,959,421 A | 5/1976 | Weber et al. |
| 4,100,324 A | 7/1978 | Anderson et al. |
| 4,118,531 A | 10/1978 | Hauser |
| 4,211,689 A | 7/1980 | Borman |
| 4,215,682 A | 8/1980 | Kubik et al. |
| 4,295,652 A | 10/1981 | Saito et al. |
| 4,307,002 A | 12/1981 | Wagner et al. |
| 4,415,727 A | 11/1983 | Toga et al. |
| 4,419,993 A | 12/1983 | Petersen |
| 4,659,609 A | 4/1987 | Lamers et al. |
| 4,661,255 A | 4/1987 | Aumann et al. |
| 4,787,699 A | 11/1988 | Moulin |
| 4,806,204 A | 2/1989 | Manfre et al. |
| 4,843,247 A | 6/1989 | Yamazoe et al. |
| 5,058,678 A | 10/1991 | Dill et al. |
| 5,089,123 A | 2/1992 | DeVoe |
| 5,108,820 A | 4/1992 | Kaneko et al. |
| 5,132,225 A | 7/1992 | Dickakian |
| 5,209,842 A | 5/1993 | Moor |
| 5,271,883 A | 12/1993 | Timmons et al. |
| 5,324,612 A | 6/1994 | Maeda et al. |
| 5,336,552 A | 8/1994 | Strack et al. |
| 5,378,632 A | 1/1995 | Solly et al. |
| 5,382,400 A | 1/1995 | Pike et al. |
| 5,411,576 A | 5/1995 | Jones et al. |
| 5,458,767 A | 10/1995 | Stone |
| 5,472,481 A | 12/1995 | Jones et al. |
| 5,507,942 A | 4/1996 | Davis |
| 5,580,459 A | 12/1996 | Powers et al. |
| 5,620,779 A | 4/1997 | Levy et al. |
| 5,639,541 A | 6/1997 | Adam |
| 5,652,048 A | 7/1997 | Haynes et al. |
| 5,706,804 A | 1/1998 | Baumann et al. |
| 5,711,767 A | 1/1998 | Gande et al. |
| 5,759,926 A | 6/1998 | Pike et al. |
| 5,908,598 A | 6/1999 | Rousseau et al. |
| 5,916,677 A | 6/1999 | Chen et al. |
| 5,969,237 A | 10/1999 | Jones et al. |
| 5,972,063 A | 10/1999 | Dudrey et al. |
| 5,997,739 A | 12/1999 | Clausen et al. |
| 6,087,662 A | 7/2000 | Wilt et al. |
| 6,090,731 A | 7/2000 | Shipp et al. |
| 6,200,669 B1 | 3/2001 | Marmon et al. |
| 6,267,252 B1 | 7/2001 | Amsler |
| 6,322,604 B1 | 11/2001 | Midkiff |
| 6,414,085 B1 | 7/2002 | Karas et al. |
| 6,585,838 B1 | 7/2003 | Mullins et al. |
| 7,049,254 B2 | 5/2006 | Bansal et al. |
| 7,137,510 B1 | 11/2006 | Klein et al. |
| 7,250,126 B2 | 7/2007 | Haberkamp et al. |
| 7,309,372 B2 | 12/2007 | Kahlbaugh et al. |
| 7,314,497 B2 | 1/2008 | Kahlbaugh et al. |
| 7,468,335 B2 | 12/2008 | Imes et al. |
| 7,485,170 B2 | 2/2009 | Wang et al. |
| 7,754,041 B2 | 7/2010 | Brandner et al. |
| 7,901,572 B2 | 3/2011 | Sato et al. |
| 7,938,963 B2 | 5/2011 | Klein et al. |
| 8,057,567 B2 | 11/2011 | Webb et al. |
| 8,173,013 B2 | 5/2012 | Sato et al. |
| 8,268,033 B2 | 9/2012 | Rogers et al. |
| 8,512,435 B2 | 8/2013 | Rogers et al. |
| 8,608,817 B2 | 12/2013 | Wertz et al. |
| 8,689,985 B2 | 4/2014 | Bates et al. |
| 9,056,268 B2 * | 6/2015 | Jones ............... B01D 39/2024 |
| 10,226,723 B2 * | 3/2019 | Jones ............... B01D 39/2024 |
| 11,565,206 B2 * | 1/2023 | Jones ............... B01D 39/2024 |
| 2003/0045192 A1 | 3/2003 | Midkiff et al. |
| 2003/0080046 A1 | 5/2003 | Ito |
| 2005/0016905 A1 | 1/2005 | Lindow |
| 2005/0023201 A1 | 2/2005 | Sato et al. |
| 2005/0160711 A1 | 7/2005 | Yang |
| 2005/0223629 A1 | 10/2005 | Sutkowski et al. |
| 2006/0096263 A1 | 5/2006 | Kahlbaugh |
| 2006/0229222 A1 | 10/2006 | Muller et al. |
| 2006/0266693 A1 | 11/2006 | Yoshida et al. |
| 2006/0266701 A1 | 11/2006 | Dickerson et al. |
| 2006/0277877 A1 | 12/2006 | Shields et al. |
| 2007/0039300 A1 * | 2/2007 | Kahlbaugh ........ B01D 39/2024 55/528 |
| 2007/0075015 A1 | 4/2007 | Bates et al. |
| 2007/0084776 A1 | 4/2007 | Sasur |
| 2007/0254798 A1 | 11/2007 | Addiego et al. |
| 2008/0073296 A1 | 3/2008 | Dema et al. |
| 2008/0105626 A1 | 5/2008 | Jones et al. |
| 2008/0135469 A1 | 6/2008 | Fremont et al. |
| 2008/0145500 A1 | 6/2008 | Stournaras et al. |
| 2008/0149561 A1 | 6/2008 | Chu et al. |
| 2008/0295394 A1 | 12/2008 | Furuta et al. |
| 2008/0308488 A1 | 12/2008 | Iwakata et al. |
| 2009/0050578 A1 | 2/2009 | Israel et al. |
| 2009/0120048 A1 | 5/2009 | Wertz et al. |
| 2010/0038304 A1 | 2/2010 | Chen et al. |
| 2010/0072126 A1 | 3/2010 | Tsujimoto et al. |
| 2010/0291213 A1 | 11/2010 | Berrigan et al. |
| 2011/0049041 A1 | 3/2011 | Yonemoto |
| 2011/0079553 A1 | 4/2011 | Thomson et al. |
| 2011/0162337 A1 | 7/2011 | Healey et al. |
| 2011/0198280 A1 | 8/2011 | Jones et al. |
| 2012/0292252 A1 | 11/2012 | Chase et al. |
| 2013/0340613 A1 | 12/2013 | Krupnikov et al. |
| 2014/0326661 A1 | 11/2014 | Madsen et al. |
| 2016/0038865 A1 | 2/2016 | Jones et al. |
| 2017/0225105 A1 | 8/2017 | Rogers et al. |
| 2019/0270040 A1 | 9/2019 | Jones et al. |
| 2021/0322906 A1 | 10/2021 | Madsen et al. |

FOREIGN PATENT DOCUMENTS

| | | |
|---|---|---|
| CN | 1284007 | 2/2001 |
| CN | 1364095 | 8/2002 |
| CN | 1416934 | 5/2003 |
| CN | 1711384 | 12/2005 |
| CN | 101098741 | 1/2008 |
| CN | 101272840 | 9/2008 |
| CN | 101553660 | 10/2009 |
| CN | 101784322 | 7/2010 |
| CN | 101934172 | 1/2011 |
| CN | 101939072 | 1/2011 |
| CN | 103874533 | 6/2014 |
| CN | 201180008682.5 | 3/2016 |
| CN | 112316564 | 2/2021 |
| DE | 934889 | 11/1955 |
| DE | 4344819 | 7/1994 |
| DE | 102010036337 | 3/2011 |
| EP | 0245512 | 11/1987 |
| EP | 0397403 | 11/1990 |
| EP | 0947577 | 10/1999 |
| EP | 1894609 | 3/2008 |
| EP | 2065081 | 6/2009 |
| EP | 2741838 | 6/2014 |
| GB | 847592 | 9/1960 |
| GB | 2404347 | 2/2005 |
| IN | 1884CHENP2014 A | 5/2015 |
| JP | H03175141 | 7/1991 |
| JP | 05261223 | 10/1993 |
| JP | 2002028418 | 1/2002 |
| JP | 2003047957 | 2/2003 |
| JP | 2003236321 | 8/2003 |
| JP | 2005048721 | 2/2005 |
| JP | 2005152769 | 6/2005 |
| JP | 2006061789 | 3/2006 |
| JP | 2006521497 | 9/2006 |

(56) References Cited

FOREIGN PATENT DOCUMENTS

| | | |
|---|---|---|
| JP | 2006326515 | 12/2006 |
| JP | 2007117945 | 5/2007 |
| JP | 3134943 | 8/2007 |
| JP | 2007533849 | 11/2007 |
| JP | 2008000652 | 1/2008 |
| JP | 2008518772 | 6/2008 |
| JP | 2008221138 | 9/2008 |
| JP | 2008274806 | 11/2008 |
| JP | 2009517326 | 4/2009 |
| JP | 2009532195 | 9/2009 |
| JP | 2010019151 | 1/2010 |
| JP | 2011045825 | 3/2011 |
| WO | 9634673 | 11/1996 |
| WO | 9926710 | 6/1999 |
| WO | 0107143 | 2/2001 |
| WO | 03093557 | 11/2003 |
| WO | 2007027669 | 3/2006 |
| WO | 2006052732 | 5/2006 |
| WO | 2008086897 | 7/2008 |
| WO | 2008103736 | 8/2008 |
| WO | 2008121526 | 10/2008 |
| WO | 2009002612 | 12/2008 |
| WO | 2010009043 | 1/2010 |
| WO | 2010088403 | 8/2010 |
| WO | 2011028661 | 3/2011 |
| WO | 2011100712 | 8/2011 |
| WO | 2013025445 | 2/2013 |

OTHER PUBLICATIONS

"Communication Pursuant to Article 94(3) EPC," for European Patent Application No. 11704707.6 mailed Mar. 26, 2018 (4 pages).
"Communication Pursuant to Article 94(3) EPC," for European Patent Application No. 16154980.3 mailed May 13, 2020 (4 pages).
"Communication Under Rule 71(3) EPC," for European Patent Application No. 12750664.0, mailed Sep. 28, 2015 (7 pages).
"Decision of Rejection," for Brazilian Patent Application No. 1120140033536 mailed Dec. 2, 2020 (4 pages) English Translation Only.
"Decision of Rejection," for Brazilian Patent Application No. 122021009061-0 mailed Mar. 28, 2022 (7 pages) with English Translation.
"Examination Report," for Indian Patent Application No. 1884CHENP2014 mailed Mar. 15, 2019 (7 pages).
"Examination Report," for Indian Patent Application No. 2498/KOLNP/2012 mailed Dec. 28, 2018 (6 pages).
"Extended European Search Report," for European Patent Application No. 20156252.7 mailed Apr. 28, 2020 (6 pages).
"Final Office Action," for U.S. Appl. No. 13/027,119, mailed Jan. 14, 2014 (8 pages).
"Final Office Action," for U.S. Appl. No. 13/027,119, mailed Jul. 12, 2013 (7 pages).
"Final Office Action," for U.S. Appl. No. 14/238,436 mailed Jan. 27, 2020 (20 pages). 758.
"Final Office Action," for U.S. Appl. No. 14/238,436 mailed Jan. 27, 2021 (22 pages).
"Final Office Action," for U.S. Appl. No. 14/238,436 mailed May 24, 2019 (18 pages).
"Final Office Action," for U.S. Appl. No. 14/238,436 mailed Sep. 4, 2018 (13 pages).
"Final Office Action," for U.S. Appl. No. 14/717,854 mailed Jul. 3, 2018 (12 pages).
"Final Office Action," for U.S. Appl. No. 16/298,000 mailed Jul. 16, 2021 (20 pages).
"Final Office Action," for U.S. Appl. No. 16/298,000 mailed May 31, 2022 (17 pages).
"Final Office Action," for U.S. Appl. No. 16/298,000 mailed Nov. 23, 2021 (20 pages).
"Final Office Action," for U.S. Appl. No. 16/298,000 mailed Oct. 8, 2020 (25 pages).

"First Office Action," for Chinese Patent Application No. 201180008682.5 mailed Apr. 28, 2014 (14 Pages) with English translation.
"First Office Action," for Chinese Patent Application No. 201710669390.5 mailed May 7, 2019 (15 pages) with English Translation.
"International Preliminary Report on Patentability," for PCT/US2011/024791, mailed Aug. 23, 2012 (10 pages).
"International Preliminary Report on Patentability," for PCT/US2012/050176, mailed Feb. 27, 2014 (10 pages).
"International Search Report and Written Opinion," for PCT/US2012/050176, mailed May 28, 2013 (14 pages).
"Invitation to Pay Additional Fees," for PCT/US2012/050176 mailed Feb. 19, 2013 (6 pages).
"Non-Final Office Action," for Japanese Patent Application No. 2012-553085, mailed Jul. 10, 2015 (7 pages) with English Summary.
"Non-Final Office Action," for U.S. Appl. No. 13/027,119 mailed Dec. 19, 2012 (17 pages)/.
"Non-Final Office Action," for U.S. Appl. No. 13/027,119, mailed Jul. 15, 2014 (8 pages).
"Non-Final Office Action," for U.S. Appl. No. 14/238,436 mailed Apr. 17, 2018 (12 pages).
"Non-Final Office Action," for U.S. Appl. No. 14/238,436 mailed Jan. 28, 2019 (19 pages).
"Non-Final Office Action," for U.S. Appl. No. 14/238,436 mailed Jun. 22, 2020 (22 pages).
"Non-Final Office Action," for U.S. Appl. No. 14/238,436 mailed Oct. 9, 2019 (20 pages).
"Non-Final Office Action," for U.S. Appl. No. 14/717,854 mailed Mar. 5, 2018 (21 pages).
"Non-Final Office Action," for U.S. Appl. No. 16/298,000 mailed Mar. 8, 2021 (21 pages).
"Non-Final Office Action," for U.S. Appl. No. 16/298,000 mailed May 1, 2020 (40 pages).
"Notice of Allowance," for Chinese Patent Application No. 201180008682.5, mailed Dec. 4, 2014 (3 pages) with English translation.
"Notice of Allowance," for U.S. Appl. No. 14/717,854 mailed Oct. 26, 2018 (9 pages).
"Office Action," for Brazilian Patent Application No. 1120120200992 mailed Jan. 29, 2021 (7 pages) with English Translation.
"Office Action," for Brazilian Patent Application No. BR1120120200992 mailed Sep. 8, 2020 (7 pages) with English Translation.
"Office Action," for Japanese Patent Application No. 2018126319 mailed Jun. 24, 2019 (10 pages) with English Summary.
"Office Action," for Japanese Patent Application No. 2020-26380 mailed Apr. 5, 2021 (7 pages) with English Summary.
"Office Action," for Korean Patent Application No. 10-2014-7006150 mailed Apr. 27, 2020 (6 pages) with English Translation.
"Office Action," for Korean Patent Application No. 10-2014-7006150 mailed Jul. 31, 2019 (23 pages) with English Translation.
"Office Action," for Korean Patent Application No. 10-2014-7006150 mailed Nov. 29, 2018 (11 pages).
"Preliminary Office Action," for Brazilian Patent Application No. BR112014003353-6 dated Jul. 30, 2019 (8 pages) with English translation.
"Response to Final Rejection," mailed on Sep. 4, 2018, U.S. Appl. No. 14/238,436, submitted via EFS-Web on Dec. 4, 2018, 8 pages.
"Response to Final Office Action," mailed on Jul. 3, 2018, for U.S. Appl. No. 14/717,854, submitted via EFS-Web on Oct. 3, 2018, 8 pages.
"Response to Final Rejection," mailed on Jan. 27, 2020 for U.S. Appl. No. 14/238,436, submitted via EFS-Web on May 27, 2020, 9 pages.
"Response to Final Rejection," mailed on Jul. 16, 2021 for U.S. Appl. No. 16/298,000, submitted via EFS-Web on Oct. 18, 2021, 8 pages.
"Response to Final Rejection," mailed on May 24, 2019 for U.S. Appl. No. 14/238,436, submitted via EFS-Web on Aug. 26, 2019, 9 pages.

(56) References Cited

OTHER PUBLICATIONS

"Response to Final Rejection," mailed on May 31, 2022 for U.S. Appl. No. 16/298,000, submitted via EFS-Web on Aug. 31, 2022, 8 pages.
"Response to Final Rejection," mailed on Nov. 23, 2021 for U.S. Appl. No. 16/298,000, submitted via EFS-Web on Feb. 23, 2021, 10 pages.
"Response to Final Rejection," mailed on Oct. 8, 2020 for U.S. Appl. No. 16/298,000, submitted via EFS-Web on Feb. 8, 2021, 8 pages.
"Response to Non-Final Rejection," mailed on Jan. 28, 2019, for U.S. Appl. No. 14/238,436, submitted via EFS-Web on Apr. 26, 2019, 9 pages.
"Response to Non-Final Rejection," mailed on Jun. 22, 2020 for U.S. Appl. No. 14/238,436, submitted via EFS-Web on Oct. 22, 2020, 11 pages.
"Response to Non-Final Rejection," mailed on Mar. 8, 2021 for U.S. Appl. No. 16/298,000, submitted via EFS-Web on Jun. 8, 2021, 9 pages.
"Response to Non-Final Rejection," mailed on May 1, 2020 for U.S. Appl. No. 16/298,000, submitted via EFS-Web on Sep. 1, 2020, 9 pages.
"Response to Non-Final Rejection," mailed on Oct. 9, 2019 for U.S. Appl. No. 14/238,436, submitted via EFS-Web on Jan. 8, 2020, 9 pages.
"Response to," Non-Final Rejection mailed Apr. 17, 2018, for U.S. Appl. No. 14/238,436, submitted via EFS-Web on Jul. 17, 2018, 9 pages.
"Response to," Non-Final Rejection mailed on Mar. 5, 2018, for U.S. Appl. No. 14/717,854, submitted via EFS-Web on Jun. 5, 2018, 9 pages.
"Second Office Action," for Chinese Patent Application No. 201180008682.5, mailed Mar. 20, 2015 (12 pages) with English translation.
"Second Office Action," for Chinese Patent Application No. 201280043992.5, mailed Dec. 1, 2015 (15 pages) with translation.
"Second Office Action," for Chinese Patent Application No. 201710669390.5 mailed Dec. 23, 2019 (16 pages) with English Translation.
"Technical Examination Report," for Brazilian Patent Application No. 122021009061-0 mailed Aug. 16, 2021 (6 pages) with English Translation.
"Technical Examination Report," for Brazilian Patent Application No. BR1120140033536 mailed Aug. 14, 2020 (4 pages) English Translation Only.
"Third Office Action," for Chinese Patent Application No. 201710669390.5 mailed Apr. 9, 2020 (10 pages) with English Translation.
Communication Pursuant to Rules 161(1) and 162 EPC for European Patent Application No. 12750664.0, mailed Mar. 21, 2014 (2 pages).
Extended European Search Report for European Patent Application No. 16154980.3 mailed Jan. 25, 2017 (9 pages).
Final Office Action for U.S. Appl. No. 14/238,436 mailed Oct. 30, 2017 (12 pages).
Final Office Action for U.S. Appl. No. 14/717,854 mailed Aug. 2, 2017 (29 pages).
First Office Action for Chinese Patent Application No. 201610090269.2 mailed Apr. 20, 2017 (14 pages) with English translation.
First Office Action for Japanese Patent Application No. 2016-150374 mailed Oct. 6, 2017 (11 pages) with English translation.
Fourth Office Action for Chinese Patent Application No. 201280043992.5 mailed Feb. 8, 2017 (4 pages), English translation.
International Search Report and Written Opinion for PCT/US2011/024791, mailed Jul. 11, 2011 (15 pages).
Non-Final Office Action for U.S. Appl. No. 14/238,436 mailed Apr. 18, 2017 (38 pages).
Non-Final Office Action for U.S. Appl. No. 14/717,854, mailed Jan. 20, 2017 (23 pages).
Notice of Opposition for European Patent Application No. 12750664.0 on behalf of Clarcor Inc., mailed Feb. 14, 2017 (16 pages).
Notice of Opposition for European Patent Application No. 12750664.0 on behalf of Mahle International GmbH, mailed Feb. 14, 2017 (22 pages) with English translation.
Notice of Opposition for European Patent Application No. 12750664.0 on behalf of Mann+Hummel International GmbH & Co. KG, mailed Feb. 14, 2017 (60 pages) with English translation.
Office Action for Chinese Patent Application No. 201280043992.5 mailed on Jan. 29, 2015 (17 pages) with English translation.
Response to Final Rejection mailed on Oct. 30, 2017, for U.S. Appl. No. 14/238,436 submitted via EFS-Web on Feb. 28, 2018, 9 pages.
Response to Non-Final Office Action mailed Apr. 18, 2017, for U.S. Appl. No. 14/238,436, submitted via EFS-Web on Sep. 18, 2017, 8 pages.
Second Office Action for Chinese Patent Application No. 201610090269.2 mailed Dec. 5, 2017 (12 pages).
Third Office Action for Chinese Patent Application No. 201280043992.5 mailed Aug. 10, 2016 (19 pages) with English translation.
Beaver, Bruce D., et al."Kinetic Study of the Oxygenation of 2,5-Dimethylpyrrole. A Model Compound Study Designed To Probe Initiation of the Oxidative Degradation of Petroleum Products," Energy & Fuels, 1994, vol. 8, No. 2, 455-462.
Cooney, John V., et al."Oxygen absorption by 2,5-dimethylpyrrole doped shale diesel fuel," Fuel, Mar. 1986, vol. 65, p. 433-436.
Ellison, Christopher J., et al."Melt Blown Nanofibers: Fiber Diameter Distributions and Onset of Fiber Breakup," Polymer 48 (2007), pp. 3306-3316 (11 pages).
Frankenfeld, John W., et al."Deposit Formation from Deoxygenated Hydrocarbons. 4. Studies in Pure Compound Systems," Industrial & Engineering Chemistry Product Research and Development, 1980, vol. 19 (1), pp. 65-70.
Frankenfeld, John W., et al."Storage Stability of Synfuels from Oil Shale. 2. Effects of Nitrogen Compound Type and the Influence of Other Nonhydrocarbons on Sediment Formation in Model Fuel Systems," Industrial & Engineering Chemistry Product Research and Development, 1983, vol. 22 (4), pp. 615-621.
Frankenfeld, John W., et al."Storage Stability of Synfuels from Oil Shale. 1. General Features of Sediment Formation in Model Fuel Systems," Industrial & Engineering Chemistry Product Research and Development, 1983, vol. 22, pp. 608-614.
Frankenfeld, John W., et al."Storage Stability of Synfuels from Oil Shale. 3. Studies with Actual Shale-Derived Middle Distillates," Industrial & Engineering Chemistry Product Research and Development, 1983, vol. 22 (4), pp. 622-627.
Loeffler, M. Constance"Role of nitrogen- and sulphur-containing compounds in the ageing of liquid fuels," Fuel, Aug. 1985, vol. 64, p. 1047-1053.
Mushrush, George W., et al."Chemical Basis of Instability of Shale-Derived Middle Distillate Fuels: A Model Study of the Interactive Effects between 2,5-Dimethylpyrrole and 3-Methylindole with Sulfonic and Carboxylic Acids," Energy & Fuels, 1991, vol. 5, No. 5, 749-753.
Reddy, K. T., et al."Degradation Mechanisms of n-Dodecane with Sulfur and Nitrogen Dopants During Thermal Stressing," J. Propulsion, 1989, vol. 5, No. 1, pp. 6-13 (8 pages).
Simmonds, Glen E., et al."Designing Nonwovens to Meet Pore Size Specifications," Journal of Engineered Fibers and Fabrics, vol. 2, Issue 1, 2007 (15 pages).
Taylor, W. F., et al."Deposit Formation from Deoxygenated Hydrocarbons. 3. Effects of Trace Nitrogen and Oxygen Compounds," Industrial & Engineering Chemistry Product Research and Development, 1978, vol. 17, No. 1, pp. 86.90 (5 pages).
"Communication pursuant to Article 94(3) EPC," for European Patent Application No. 20156252.7 mailed Feb. 20, 2024 (5 pages).
"Non-Final Office Action," for U.S. Appl. No. 17/360,859 mailed Aug. 14, 2024 (41 pages).
"Office Action," for Brazilian Patent Application No. BR1120140033536 mailed Jul. 16, 2024 (13 pages) with English translation.

* cited by examiner

LIQUID FILTRATION MEDIA, FILTER ELEMENTS AND METHODS

CROSS REFERENCE TO RELATED APPLICATIONS

This application is a continuation of U.S. application Ser. No. 16/298,000, filed Mar. 11, 2019, which is a continuation of U.S. application Ser. No. 14/717,854, filed May 20, 2015, now U.S. Pat. No. 10,226,723, which is a continuation of U.S. application Ser. No. 13/027,119, filed Feb. 14, 2011, now U.S. Pat. No. 9,056,268, issued Jun. 16, 2015, which claims the benefit of U.S. Provisional Application No. 61/304,232, filed Feb. 12, 2010, the contents of which are herein incorporated by reference in their entirety.

FIELD OF THE INVENTION

The present invention is directed to filtration media, filter elements, and methods of filtering liquid fuels. In particular, the invention is directed to filtration media for the removal of fuel degradation products (FDPs) and other contaminants from liquid fuels.

BACKGROUND

Liquid fuels, such as diesel fuel, are used in internal combustion engines of various configurations and sizes. Such fuels must generally be filtered so as to remove particulate contaminants, which can otherwise create significant problems in engine performance and can result in damage to the engine. Filter media for removal of these particulate contaminants has generally been required to remove very high percentages of particles, necessitating use of filter media with tight pore structures. Without such tight pore structures, unacceptable levels of particles can pass through the filter media and detrimentally affect engine performance.

One media currently used for removal of particulate contaminants from fuel streams is melt-blown media that allows for effective removal of particulate contaminants. Although melt-blown media can perform adequately in removing particulate contaminants from liquid fuels, the melt-blown media can readily foul from buildup of contaminants other than traditional particulate contaminants. This premature fouling appears to be particularly pronounced in situations where fuel undergoes repeated heating and cooling cycles, such as in common rail systems used on many diesel engines. In such systems diesel fuel is pumped from a fuel tank at high pressure along a common conduit (or rail) that is connected to multiple fuel injectors. Some of the diesel fuel passes through the fuel injectors and is combusted, but the remainder is delivered back to the fuel tank at an increased temperature as a result of travelling down the common rail through portions of the hot diesel engine. Once back in the tank the fuel rapidly cools. Repeated cycles of heating and cooling of the fuel are believed to contribute in the production of fuel degradation products that accelerate fouling of traditional fuel filter media.

In addition to filter-clogging materials generated as a result of heating and cooling cycles, additional sources of contaminants that can reduce fuel filter performance include ingredients found in various biodiesel mixtures. Although often distinct in origin from the fuel degradation products formed during heating and cooling cycles, these contaminants can also contribute to significant reductions in fuel filter life by accumulating on the filter media. Finally, even normal aging of fuel, especially when it occurs at heightened temperatures, can result in production of fuel contaminants that further limit fuel filter life due to fouling and clogging of filter media earlier than would otherwise be expected if only hard particle contaminants were present.

Therefore, a substantial need exists for filtration media, filter elements, and filtration methods that can be used for removing contaminant materials from liquid fuel streams. The invention provides such media, filter elements and methods.

SUMMARY OF THE INVENTION

The present invention is directed to filter media configured and arranged for placement in a fluid fuel stream, to filter elements manufactured using the filter media, and to methods of filtering fuel streams. The filter media and elements are configured for applications where fuel can contain various additional contaminants besides conventional hard particles. These additional contaminants can include (for example) waxes, asphaltenes, sterol glucosides, steryl glucosides, sterol glycosides, and various fuel degradation products (FDPs). Collectively, these additional contaminants can be referred to as fuel contamination products (FCPs). For diesel fuel filtration, in particular, the filter media is especially configured to remove fuel degradation products (FDPs), as well as similar fuel contamination products (FCPs).

In a first example embodiment, the filter media comprises an upstream layer of filter media and a downstream layer of filter media. The upstream layer of filter media contains thermally bonded polymeric bicomponent fibers and glass fibers. The downstream layer of filter media comprises cellulose fibers. In this example embodiment, the upstream layer of media containing bicomponent and glass fibers can be laminated to the downstream cellulose media. The upstream layer of media containing the bicomponent and glass fibers has been shown to remove fuel degradation products in a manner such that filter life is preserved, or even extended, relative to prior art filter media. The downstream cellulose layer serves a dual role as a support layer for the upstream filter layer, while also functioning to remove hard particles from the fuel stream. The upstream removal of the fuel degradation products avoids fouling of the downstream cellulose layer with the fuel degradation products, thereby allowing the downstream cellulose layer to capture hard particles without premature fouling, despite a tight pore structure. In addition, in certain embodiments the downstream cellulose layer can be constructed with a tighter pore structure than would otherwise be possible without the upstream layer (or layers) of media containing bicomponent and glass fibers, because the upstream layer (or layers) remove fuel degradation products (or fuel contaminant products) that would otherwise prematurely foul the tighter pore structures.

More generally, the invention is directed to various filter constructions that allow for removal of contaminants such as fuel degradation products and other fuel contamination products. Such filter constructions can comprise one or more areas of filter media containing a mixture of at least two types of fibers: (1) a media fiber and (2) a binder fiber.

Media fiber is that fiber that provides primary filtration properties to the media, such as controllable pore size, permeability and efficiency. The media fiber used in accordance with the invention may be, for example, glass fiber or carbon fiber.

The binder fiber provides support for the media fiber, and adds improved handling, adds greater strength, and results in lower compressibility to the media. The binder fiber may be, for example, a bicomponent fiber. The use of the bicomponent fiber enables the formation of a media layer (or layers) or filter element with no separate resin binder or with minimal amounts of a resin binder. The lack of a resin binder substantially reduces or prevents film formation from the resin binder and also prevents lack of uniformity in the media or element due to migration of the resin to a particular location of the media layer. The use of the bicomponent fiber reduces compressibility, and allows for lower solidity, increases tensile strength and improves bonding of media fiber such as glass fiber and other sub-micron fiber materials that are added to the media layer or filter element. Also, in certain implementations the binder fiber provides improved processability during furnish formulation, sheet or layer formation, and downstream processing: including thickness adjustment, drying, cutting and filter element formation.

In general, the media fiber has a much smaller diameter than the binder fiber. In example embodiments the media fiber has an average diameter less than 5 microns, while the binder fiber has an average diameter greater than 5 microns. More typically, the media fiber will have an average diameter from 0.1 to 20 microns, and optionally from 0.1 to 15 microns. In some implementations the media fiber will have an average diameter from 0.4 to 12 microns, and in some implementations from 0.4 to 6.5 microns. Media fibers with an average diameter of less than 10 microns, less than 7.5 microns, less than 6.5 microns, and less than 5 microns are often desirable.

The binder fiber will typically have a diameter from 5 to 40 microns, more typically from 7 to 20 microns, and often from 10 to 14 microns. It will be noted that the diameter of both the media fibers and the binder fibers can be variable. In some cases, the fiber diameters will vary along their lengths, while more commonly multiple different fibers of various diameters will be incorporated. It will be understood that, as used herein, fiber diameters are based upon average fiber diameters for the fibers present in the media.

A further characteristic of filter media made in accordance with the present invention, and in particular that portion of the media associated with sequestering FDPs (and related contaminants), is that the media typically has a relatively low solidity level. As used herein, solidity is the solid fiber volume divided by the total volume of the filter medium at issue, usually expressed as a percentage. In a typical implementation, solidity of the filter media associated with sequestering FDPs is less than 15 percent, more typically less than 12 percent, and more frequently less than 10 percent. In certain embodiments the solidity is less than 9 percent, less than 8 percent, or less than 7 percent.

An additional characteristic of the filter media made in accordance with the present invention is that it is relatively incompressible, especially relative to the solidity of the media. In a first example embodiment, the filter media has a compressibility of less than 40 percent at a pressure of 1.24 kg/cm$^2$. In other implementations the filter media has a compressibility of less than 30 percent at a pressure of 1.24 kg/cm$^2$, less than 20 percent at a pressure of 1.24 kg/cm$^2$, and less than 10 percent at a pressure of 1.24 kg/cm$^2$. It will thus be understood that the filter media of the present invention, at least that portion of the media most suitable for FDP removal, will typically have a relatively low solidity as well as a relatively low compressibility (or high stiffness).

The pore structures of the media provide further metrics by which the properties of the media associated with sequestering FDPs can be measured. In general, it is possible to characterize the properties of a porous media in terms of such parameters as mean flow pore, mode flow pore, and max flow pore. In accordance with the teachings of the present invention, it is desirable in general to have at least a portion of the media with small mean flow pores, while also having a large max flow pore.

The ratio of max pore size to mean flow pore is often at least 2.5, optionally at least 5.0, and in some implementations greater than 7.5. In certain embodiments, where the mean flow pore is very small and the max flow pore is relatively high, this ratio may be greater than 10.0, and optionally greater than 12.5 or 15. High ratios of the max flow pore to the mean flow pore reflect a wider pore size distribution, which can provide for reduced fouling from FDPs (and related) contaminants.

The media can also be selected to have a favorable pore size distribution, as measured by the ratio of pore sizes at the 15.9$^{th}$ percentile to that at the 50 percentile, which is geometric standard deviation for a lognormal distribution (a distribution which is normal for the logarithm transformed value). While the media pore size distribution is not necessarily lognormal, the ratio is employed here to approximate the geometric standard deviation of the pore size distribution. Unless otherwise stated, the geometric standard deviation mentioned below will refer to the ratio defined above. The geometric standard deviation is analogous to the slope of the curve of pore diameter plotted against cumulative pore volume. A geometric standard deviation of 1.0 gives a single pore size, while a larger geometric standard deviation reflects a broadening of the pore distribution. Thus, a geometric standard deviation of 1.2 reflects a narrow distribution, and a geometric standard deviation of 2.0 indicates a meaningfully broader distribution. A geometric standard deviation of 2.5 is a relatively broad distribution. A geometric standard deviation of 3.0 is a very broad distribution. Generally, the upstream filter material of the present invention containing media fiber and binder fiber will have a geometric standard deviation of greater than 2.0, more typically greater than 3.0, and in some implementations greater than 4.0.

As noted above, filter media made in accordance with the present invention is often comprised of two or more layers: an upstream filter material (containing media fiber and binder fiber, such as glass fiber and bicomponent fiber) is desirably combined with a downstream filter material. This downstream filter material is generally selected for favorable removal of particulate contaminants. The downstream material may comprise, for example, cellulose fiber.

In some embodiments, the mode pore size of the upstream portion is greater than the mode pore size of the downstream portion. For example, the mode pore size of the upstream portion (bicomponent/glass) may be at least 20 percent or at least 40 percent greater than the mode pore size of the downstream portion (cellulose media). In another embodiment, the mode pore size of the upstream portion is at least 20 percent greater than the mode pore size of the downstream portion; and the mean flow pore size of the upstream portion is less than 90 percent of the mean pore flow size of the downstream portion. In some embodiments, the mode pore size of the upstream portion is greater than the mode pore size of the downstream portion. For example, the mode pore size of the upstream portion may be at least 40 percent greater or at least 60 percent greater than the mode pore size of the downstream portion. In some embodiments, the mean flow pore size of the upstream portion is less than the mean pore flow size of the downstream portion. For example, the mean flow pore size of the upstream portion may be less than 70 percent or less than 50 percent of the mean pore flow size of the downstream portion.

It will be appreciated that the downstream portion may contain fiber having an average diameter or cross-section greater than the average diameter of the media fiber in the upstream portion.

Throughout this specification descriptions are provided as to the properties of the various portions of the filter media. In particular, properties are described for filter media having specific attributes, such as fiber diameter, solidity, compressibility, mean flow pore, mode pore flow, and max pore. It will be understood that media made in accordance with the present invention will often show unintentional variability in these properties, such as variability along a media web, as well as unintentional variability along the thickness or depth of a sheet of media. In addition, there can be intentional variation of the properties of the filter media, such as by providing multiple layers of media with intentionally different properties, or by providing a media with a gradient construction such that media properties gradually change along the depth of the media. It will be understood that such unintentional variability, as well as intentional variation, are intended to be within the scope of the present invention.

The above summary of the present invention is not intended to describe each discussed embodiment of the present invention. This is the purpose of the figures and the detailed description that follows.

FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed in part to filter media and filter elements for the removal of contaminant material from a liquid fuel stream. The filter elements and media are configured for removal of additional contaminants besides hard particles, these additional contaminants including (for example) waxes, asphaltenes, sterol glucosides, steryl glucosides, sterol glycosides, and fuel degradation products—collectively referred to as fuel contamination products. The filter elements and media allow for improved filter performance and longevity.

Although existing fuel filtration media, such as melt blown media, can perform adequately in removing particulate contaminants from liquid fuels, the melt blown media can prematurely foul by buildup of contaminants other than traditional particulates. This premature fouling appears to be particularly pronounced in situations where fuel undergoes repeated heating and cooling cycles, such as in common rail systems used on many diesel engines.

Figure 1:
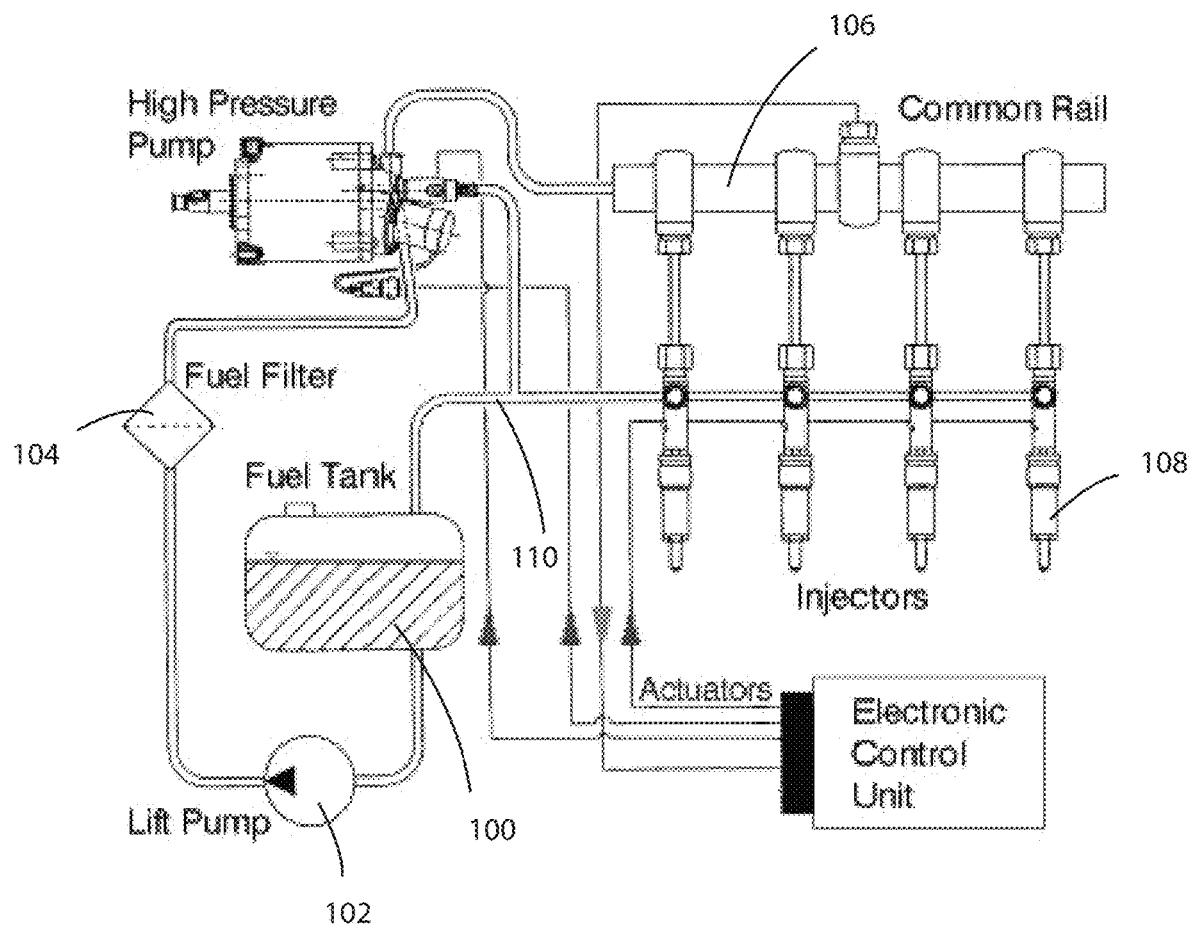
FIG. 1 is a schematic diagram of a fuel system for a diesel engine.

FIG. 1 is a schematic diagram of a common rail fuel system for a diesel engine. In FIG. 1, a fuel tank 100 is in fluid communication with a fuel pump 102 and fuel filter 104. Fuel is pumped from the fuel tank 100 through the filter 104, and then into a common rail 106 that serves as a manifold from which the diesel fuel is distributed to a plurality of injectors 108. Some of the fuel passes through the injectors 108 into combustion chambers, but excess fuel is allowed to flow back by way of return line 110 to the fuel tank 100. The fuel that is delivered back to the fuel tank is typically returned at an increased temperature as a result of travelling down the common rail through portions of the hot diesel engine. The fuel cools upon return to the fuel tank. In this manner portions of the fuel in the tank are continuously being heated and cooled whenever the engine is running.

Repeated cycles of heating and cooling of the fuel are believed to result in the production of fuel degradation products (FDPs). The FDPs can quickly accumulate on traditional fuel filtration media, resulting in premature fouling of the media. Such fouling can occur, for example, on melt blown polyester filter media, as well as on cellulose filter media. The fouling occurs as the FDPs, and potentially other fuel contaminant products (such as various waxes, asphaltenes, sterol glucosides, steryl glucosides, sterol glycosides) build up upon the filter media, causing plugging of the pores and premature failure.

Figure 2A:
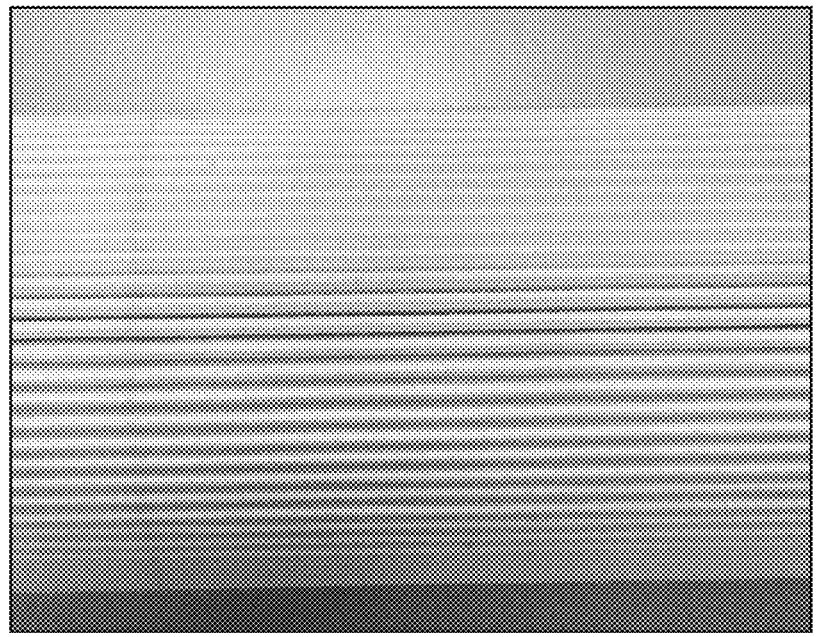
FIG. 2A is a photograph of a prior art filter media before exposure to diesel fuel.
Figure 2B:
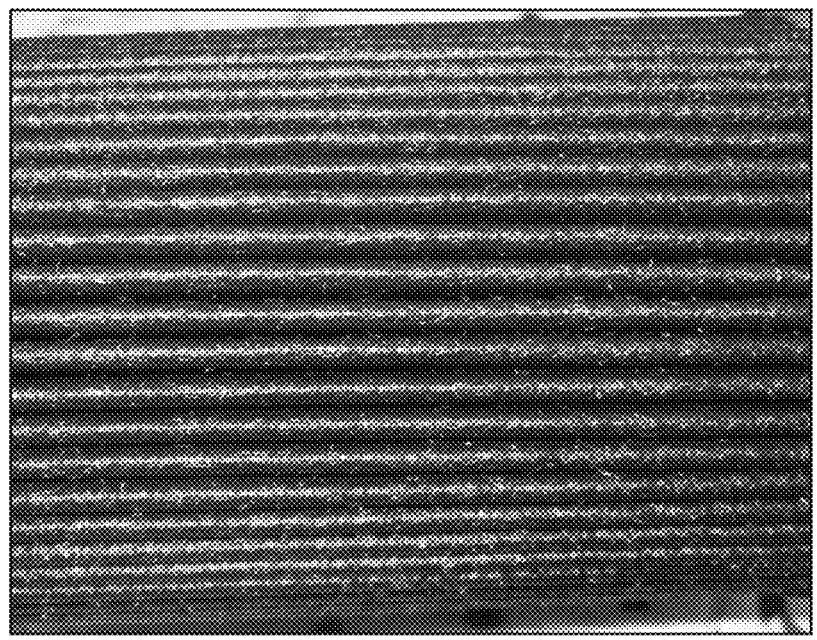
FIG. 2B is a photograph of a prior art filter media after exposure to diesel fuel.

FIGS. 2A and 2B show melt blown filter media from a commercially available fuel filter before and after extended operation on a truck with a diesel common rail fuel system. As can be seen in FIG. 2A, the melt blown filter media is clean and free of contaminants. However, after field use the melt blown material is substantially covered by an accumulation of contaminant material, as shown in FIG. 2B. The result is that the filter rapidly plugged, developing unacceptably high backpressure and had to be replaced. In the embodiment tested, performance of the filter was significantly short of an objective of 40,000 to 50,000 miles.

The present invention overcomes the shortcoming of the prior art by providing a media construction that removes fuel contaminants in a manner such that their impact on filter performance and filter life can be limited. In particular, the present invention provides one or more layers or areas of media that effectively sequester contaminants such as FDPs, while being constructed to avoid becoming prematurely plugged. By effectively sequestering the FDPs, other components within the filter (including in some cases other layers within a multi-layered media) avoid premature plugging. The result is a longer life, better performing filter media and filter element.

In an example embodiment of the invention, the filter media comprises thermally bonded glass and polyester bicomponent fibers laminated on the upstream side of cellulose media, with the cellulose also serving a dual role as a hard particle filter and a support for the thermally bonded glass. The glass and polyester bicomponent media functions to remove the FDPs in a fashion such that the FDPs are removed while premature plugging of the cellulose layer is avoided. This improved performance is achieved, in part, by selecting the glass and bicomponent fiber mixture so that the media has a relatively low solidity, while retaining a relatively low compressibility. In addition, the glass fibers, which are relatively thin and typically in high concentrations, result in a media having small mean flow pore sizes, but also typically relatively high maximum pore sizes. The use of a media that has relatively low solidity and low compressibility, while also having a small mean flow pore size but a high maximum flow pore size, results in a media construction that effectively removes FDP compounds without premature plugging.

Figure 3:
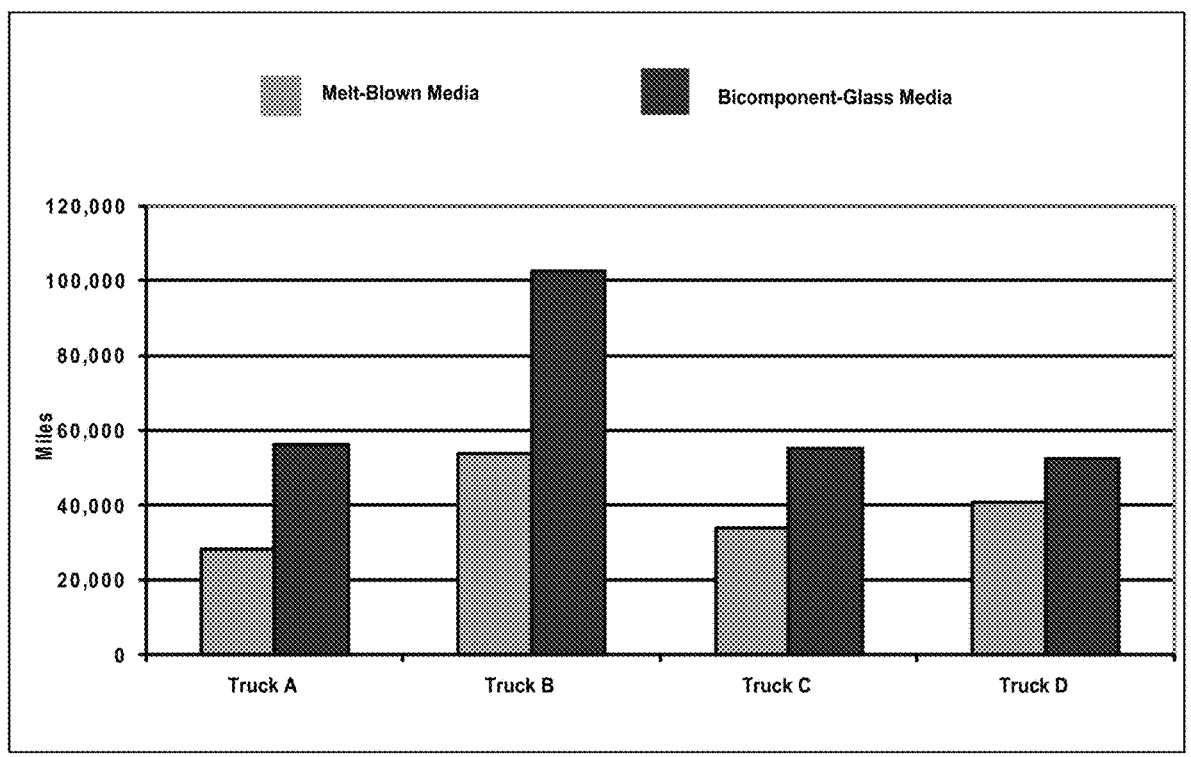
FIG. 3 is a graph showing relative performance of filter elements made in accordance with the present invention compared to prior art filter configurations having undergone extensive testing on a diesel engine, showing miles driven on each filter before replacement was necessary.

FIG. 3 is a graph showing example relative performance of filter elements made in accordance with the present invention compared to prior art filter configurations. As shown in FIG. 3, media made with a first region of glass fibers thermally bonded with bicomponent fibers, overlaying a second filter region of cellulose fibers performed significantly percent better than example prior art commercially available filter element constructed using melt-blown polyester filter media. It will be understood that the improved media of the present invention will show different performance improvements over the prior art depending upon various factors, including the nature and extent of any FDPs present in the fuel supply, which is observed by the variation in the results between the four depicted trucks. However, it will be appreciated that in general the filter media of the present invention outperforms that of the prior art melt-blown media when exposed to diesel fuel in which FDPs are believed to be present.

Suitable materials and configurations of filter media and elements will now be described in greater detail, including a discussion of the media for removing fuel contaminant products (especially FDPs), followed by a discussion of various media configurations having additional media layers or areas for removing of both FDP contaminants and traditional contaminants, a discussion of filter element configurations, and a discussion of experimental results.

A. Media for Removal of Fuel Contamination Products (Including Fuel Degradation Products)

The present invention is directed in part to various filter constructions that allow for removal of contaminants such as fuel degradation products, and in some implementations additional contaminants such as waxes, asphaltenes, sterol glucosides, steryl glucosides, and sterol glycosides. Such filter constructions can contain one or more layers or areas of filter media containing a mixture of two (or more) types of fibers: (1) a media fiber and (2) a binder fiber. These layers or areas of media may comprise thermally bonded glass and polymeric fibers as disclosed, for example, in U.S. Publication No. 2007/0039300, filed Nov. 1, 2006, the contents of which are incorporated herein by reference.

Media Fiber

Media fiber is that fiber that provides primary filtration properties to the media, such as controllable pore size, permeability and efficiency. The media fiber used in accordance with the invention may be, for example, glass fiber, carbon fiber, ceramic fibers, polyester or cellulose. A substantial proportion of glass fiber can be used in an example implementation of the media of the invention. The glass fiber provides pore size control and cooperates with the other fibers in the media to obtain a media of substantial flow rate, high capacity, substantial efficiency and high wet strength.

The term glass fiber "source" means a glass fiber composition characterized by an average diameter and aspect ratio that is made available as a distinct raw material. Suitable media fiber comprises a glass fiber used in media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers. Such fiber is typically used as a diameter about 0.1 to 10 micrometers and an aspect ratio (length divided by diameter) of about 10 to 10,000. These commercially available fibers are characteristically sized with a sizing coating. Generally suitable glass fibers should have an average diameter of less than 15 microns, more desirably less than 10 microns, and preferably less than 5 microns. Commercial sources for suitable glass materials include the following: Lauscha International, Evanite, Johns Manville, Owen Corning, and others. In addition to glass fibers, an alternative fiber suitable in some implementations for the media fiber comprises carbon fibers.

Generally suitable carbon fibers should have an average diameter of less than 25 microns, more desirably less than 15 microns, and preferably less than 10 microns. Commercial sources for suitable carbon materials include the following: Unitika, Kynol, and others. In embodiments, the filter media useful in the filter media packs of the invention contain glass fibers in an amount corresponding to about 10% to 90% by weight of the total solids in the filter medium, or about 20 to 80% by weight of the total solids in the filter medium, or about 25% to 75% by weight of the total solids in the filter medium, or about 50% by weight of the total solids in the filter medium. In some embodiments, a blend of more than one source of glass fiber is employed, wherein the blend of more than one source of glass fiber is employed to form the total weight percent of glass fiber in the filter medium. In some such embodiments, the blend of glass fiber sources is selected to control the permeability of the filter media. For example, in some embodiments, combining glass fibers from more than one source of glass fiber having an average fiber diameter of about 0.3 to 0.5 micrometer, glass fiber having an average fiber diameter of about 1 to 2 micrometers, glass fiber having an average fiber diameter about 3 to 6 micrometers, glass fiber with a fiber diameter of about 6 to 10 micrometers, and glass fiber with fiber diameter of about 10 to 100 micrometers in varying proportions, including blends of two or more thereof, increases the permeability of the filter media pack. In some such embodiments, the glass fiber blends are selected to impart a controlled pore size, resulting in a defined permeability, to a filter medium.

Binder Fiber

The binder fiber provides support for the media fiber, and adds improved handling, strength, and resistance to compression to the media fiber. In certain implementations the binder fiber also provides improved processability during furnish formulation, sheet or layer formation and downstream processing (including thickness adjustment, drying, cutting and filter element formation).

The binder fiber may be, for example, a bicomponent fiber. As used herein, "bicomponent fiber" means a fiber formed from a thermoplastic material having at least one fiber portion with a melting point and a second thermoplastic portion with a lower melting point. The physical configuration of these fiber portions is typically in a side-by-side or sheath-core structure. In side-by-side structure, the two resins are typically extruded in a connected form in a side-by-side structure. Other useful morphologies include lobed bicomponent fibers, wherein the tips of the fibers have lobes that are formed from a lower melting point polymer than the rest of the fiber.

The use of the bicomponent fiber enables the formation of a media layer or filter element that can be formed with no separate resin binder or with minimal amounts of a resin binder that substantially reduces or prevents film formation from the binder resin and also prevents lack of uniformity in the media or element due to migration of the resin to a particular location of the media layer. The use of the bicomponent fiber can permit reduced compression, improved solidity, and increased tensile strength in the filter media and improves utilization of media fiber such as glass fiber and other sub-micron fiber materials that are added to the media layer or filter element.

The media fibers and binder fibers combine in various proportions to form a high strength material having substantial filtration capacity, permeability and filtration lifetime. Such a media can be made with optional secondary fibers and other additive materials. These components combine to form a high strength material having substantial flow capacity, permeability and high strength.

Various combinations of polymers for the bicomponent fiber may be useful in the present invention, but it is important that the first polymer component melt at a temperature lower than the melting temperature of the second polymer component and typically below 205° C. Further, the bicomponent fibers are typically integrally mixed and evenly dispersed with the media fibers, such as glass fibers. Melting of the first polymer component of the bicomponent fiber is necessary to allow the bicomponent fibers to form a tacky skeletal structure, which upon cooling, captures and binds many of the media fibers, as well as binds to other bicomponent fibers. In the sheath-core structure, the low melting point (e.g., about 80 to 205° C.) thermoplastic is typically extruded around a fiber of the higher melting (e.g., about 120 to 260° C.) point material.

In use, the bicomponent fibers typically have a fiber diameter of about 5 to 50 micrometers, often about 10 to 20 micrometers, and typically in a fiber form generally have a length of 0.1 to 20 millimeters or often have a length of about 0.2 to about 15 millimeters. Such fibers can be made from a variety of thermoplastic materials including polyolefins (such as polyethylenes, polypropylenes), polyesters (such as polyethylene terephthalate, polybutylene terephthalate, polycyclohexylenedimethylene terephthalate), nylons including nylon 6, nylon 6,6, nylon 6,12, etc.

Bicomponent fibers are useful in forming mechanically stable, but strong, permeable filtration media that can withstand the mechanical stress of the passage of debris laden air at high velocity and can maintain the loading of debris during use, as well as withstand repeated washing and drying cycles between loadings. The bicomponent fibers useful in the filter assemblies of the invention are of a core/shell (or sheathed) morphology, side-by-side morphology, islands-in-the-sea morphology, or lobed morphology. The bicomponent fibers are made up of at least two thermoplastic materials having different melting points. In some embodiments, thermoplastic polymers useful in forming either the core or the sheath of the bicomponent fibers useful in filter media of the present invention include polyolefins such as polyethylene, polypropylene, polybutylene, poly-α-octene, and copolymers thereof including linear low density, low density, high density, ultra-high density, and other morphological and compositional designations; polytetrahaloethylenes such as polytetrafluoroethylene and polychlorotrifluoroethylene; polyesters such as polyethylene terephthalate, polybutylene terephthalate, or polyethylene naphthalate; polyvinyl acetate, polyvinyl alcohol, and copolymers thereof; polyvinyl halides such as polyvinyl chloride, polyvinylidene halides such as polyvinylidene chloride, polyvinylidene fluoride, and the like and copolymers thereof; polyacetals such as polyvinyl butyral, acrylic resins (polyacrylates) such as polymethylacrylate esters and polymethylmethacrylate esters and copolymers thereof including copolymers of acrylic acid and salts thereof; polyamides such as nylon 6, nylon 66, nylon 6,10, nylon 46, and the like and copolymers thereof; polystyrene and copolymers thereof; polyurethanes; polyureas; cellulosic resins, namely cellulose nitrate, cellulose acetate, cellulose acetate butyrate, ethyl cellulose, and the like; copolymers of any of the above materials, such as ethylene-vinyl acetate copolymers, ethylene-acrylic acid copolymers, styrene-butadiene block copolymers, KRATON® rubbers, and the like. In embodiments, a polyolefin/polyester sheath/core bicomponent fiber is employed whereby the polyolefin sheath melts at a lower temperature than the polyester core. In other embodiments, two polyolefins, or two polyesters, two polyvinyl halide, two polyvinylidene halide, two polyamide polymers, or any other two polymers that are similar or identical chemically are employed as core and sheath, wherein compositional (e.g. the particular monomer composition mix used to synthesize the polymer, or the blockiness of the monomer concentration in a copolymer), molecular weight, or morphological differences such as degree of branching or degree of side chain crystallization and the like provide lower and higher melting or softening polymer materials.

In some embodiments, the lower melting point component of the bicomponent fibers is employed as the sheath in a core/sheath morphology (or shell in a core/shell morphology), as the lobes in a lobed morphology, as the "islands" in an islands-in-the-sea morphology, or as one side of a side-by-side morphology. The lower melting component provides a melt fusing capability to the formed filter media pack, wherein the nonwoven wet laid or air laid webs are heated to a temperature above the melting point or glass transition temperature of the lower melting component and below the melting point or glass transition temperature of the higher melting component. In embodiments, melt fusing is accomplished when the molten or softened fiber components contact other bicomponent fibers, as well as any other fibers and additives within the formed wet laid or air laid filter media pack. In such embodiments, when the temperature is subsequently reduced to at or below the intended end use temperature, the bicomponent fibers have become at least partially melt fused by virtue of the sheath (or lobe or side), while substantially retaining the nonwoven characteristics of loft, permeability, porosity, basis weight, thickness, and the like imparted by the air laid or wet laid process employed to form the media. These nonwoven characteristics are retained by virtue of the higher melting core or side of the bicomponent fiber that retains its fibrous morphology during melt fusing. Further, the melt fused bicomponent fiber imparts desirable properties, including reduced compression and increased tensile strength; the melt fused bicomponent fiber further improves utilization and retention of glass fiber and other secondary fibers and/or additive materials in the filter media or filter assemblies of the invention.

In some embodiments, core/sheath bicomponent fibers known as Advansa 271P available from E. I. Dupont Nemours, Wilmington DE is useful in forming both the high loft and low loft filter media useful in the filter assemblies of the invention. Other useful bicomponent fibers include the T-200 series of concentric core/sheath fibers available from Fiber Innovation Technology, Inc. of Johnson City, TN; Kuraray N720, available from Engineered Fibers Technology, LLC of Shelton, CT.; Nichimen 4080, available from Nichimen America Inc. of New York, NY; and similar materials. All of these fibers demonstrate the characteristics of melt fusing as described above.

In one embodiment of the invention, a filter media useful in a media pack of the invention includes about 50% by weight of Advansa 271P bicomponent fiber (available from E. I. Dupont Nemours, Wilmington DE) and about 50% by weight of Lauscha B50 glass microfiber (available from Lauscha Fiber Intl. of Summerville, SC). The media is formed by a wet laid or papermaking type process to result in a media having a basis weight of about 60 g/m² to 70 g/m², layer thickness of 0.5 mm to 0.65 mm at 0.125 psi, compressibility of 15% to 20% between 0.125 psi and 1.5 psi, permeability of 50 m/min to 60 m/min, and solidity of 6-7% at 0.125 psi.

Media Properties

The performance properties of the filter media are significantly impacted by controlling attributes relating to the fiber size, pore structure, solidity, and compressibility of the filter media. Generally, the use of a media that has relatively low solidity and low compressibility, while also having a small mean flow pore size but a large maximum flow pore size, results in an example media construction that can remove FDP compounds without premature plugging.

In general the media fiber has a much smaller diameter than the binder fiber. In example embodiments, the media fiber has an average diameter of less than 5 microns, while the binder fiber has an average diameter of greater than 5 microns. More typically, the media fiber will have an average diameter from 0.1 to 20 microns, and optionally from 0.1 to 15 microns. In some implementations the media fiber will have an average diameter from 0.4 to 12 microns, and in some implementations from 0.4 to 6.5 microns. Media fibers with an average diameter of less than 10 microns, less than 7.5 microns, less than 6.5 microns, and less than 5 microns are often desirable. The binder fiber will typically have a diameter from 5 to 40 microns, more typically from 7 to 20 microns, and often from 10 to 14 microns. Note that the diameter of both the media fibers and the binder fibers can be variable. In some cases the fiber diameters will vary along their lengths, while more commonly fibers of different diameters will be incorporated. It will be understand that, as used herein, fiber diameters are based upon average fiber diameters for the fibers present in the media.

A further characteristic of filter media made in accordance with the present invention, and in particular that portion of the media associated with sequestering FDPs (and related fuel contaminant products), is that it typically has a relatively low solidity level. As used herein, solidity is the solid fiber volume divided by the total volume of the filter medium at issue, usually expressed as a percentage. In a typical implementation, solidity of the filter media associated with sequestering FDPs is less than 15 percent, more typically less than 12 percent, and more frequently less than 10 percent. In certain embodiments the solidity is less than 9 percent, less than 8 percent, or less than 7 percent.

An additional characteristic of the filter media made in accordance with the present invention is that it is relatively incompressible, especially relative to the solidity of the media. Compressibility is the resistance (i.e.) to compression or deformation in the direction of fluid flow through the media. A suitable test for media compression is a compression force vs. distance test, wherein a stack of media is compressed under a load to determine compression percent. An example of such a test is as follows: A 2.54 centimeter diameter probe and a 5 kg load cell are used to compress a stack of media having a total thickness of 25 mm. The test is performed at a speed of 1 mm/sec, with a 30 mm start distance from the bottom, and a data trigger of 0.5 g. The end force target is 4,800 g. The media sample size can be 2.22 centimeter diameter circle, oriented with media samples to form a stack directly underneath the test probe. The pressure on the media in such implementations is approximately 1.24 kg/cm². The number of stacked samples used should be sufficient to have a total thickness of 25 mm, thus the total number of samples will vary depending upon individual thickness of the tested media material. The data is analyzed in terms of the following equation:

$$\text{compression percent} = x/t_1$$

wherein $t_1$=thickness from the bottom of stacked samples when force=0.5 grams, and $t_2$=thickness from bottom of stacked samples when force=4,800 g, with x equal to the distance the probe travelled during the test, which is the distance $t_1$-$t_2$. Suitable instruments for performing this test include, for example, a TA.XT2i Texture Analyzer from Stable Micro Systems utilizing Texture Expert Exceed software version 2.64.

The compressive strength must be sufficient to maintain a material's thickness and thereby maintain its pore structure and filtration flow and particulate removal performance. Compressibility typical of the materials made by the invention are as follows: In a first example embodiment, the filter media containing the binder fiber and media fiber has a compressibility of less than 40 percent at a pressure of 1.24 kg/cm². In other implementations the filter media has a compressibility of less than 30 percent at a pressure of 1.24 kg/cm², less than 20 percent at a pressure of 1.24 kg/cm², and less than 10 percent at a pressure of 1.24 kg/cm². In addition, the compressibility of the media divided by the solidity percent is often less than 4, frequently less than 3, can be less than 2, and in some implementations is less than 1. For example, in an implementation where compressibility is 20 percent, and solidity is 10 percent, this number is 2.0.

Figure 4:
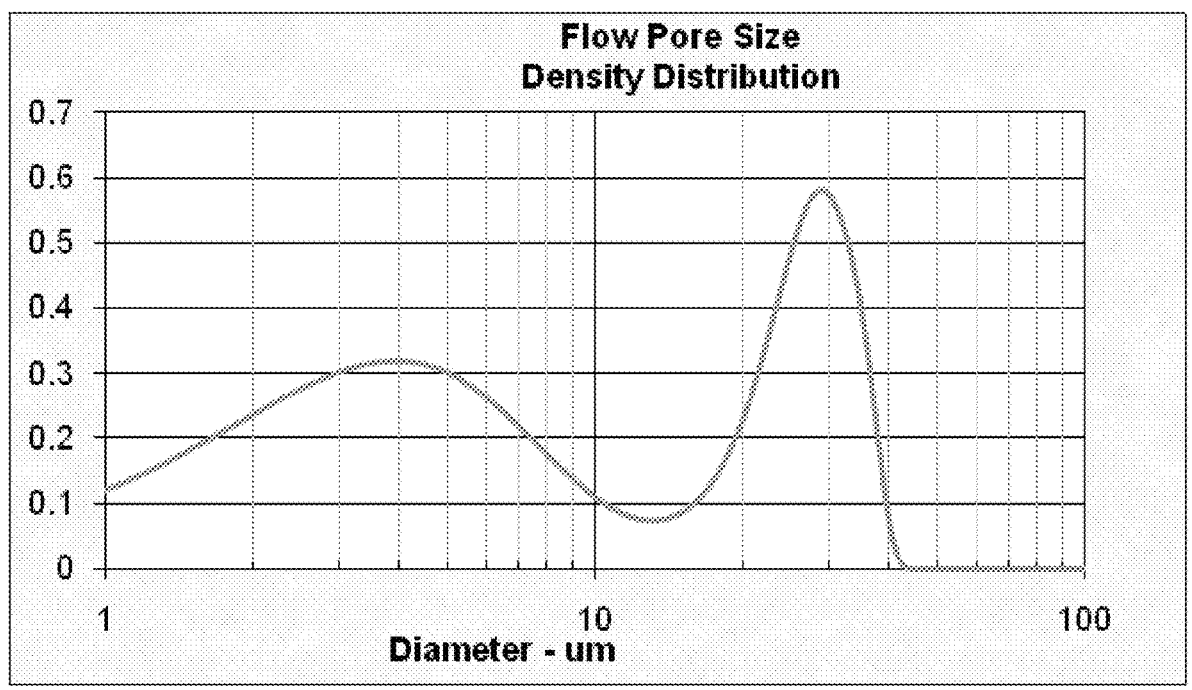
FIG. 4 is a graph of pore density versus diameter to show mode pore size for a media.
Figure 5:
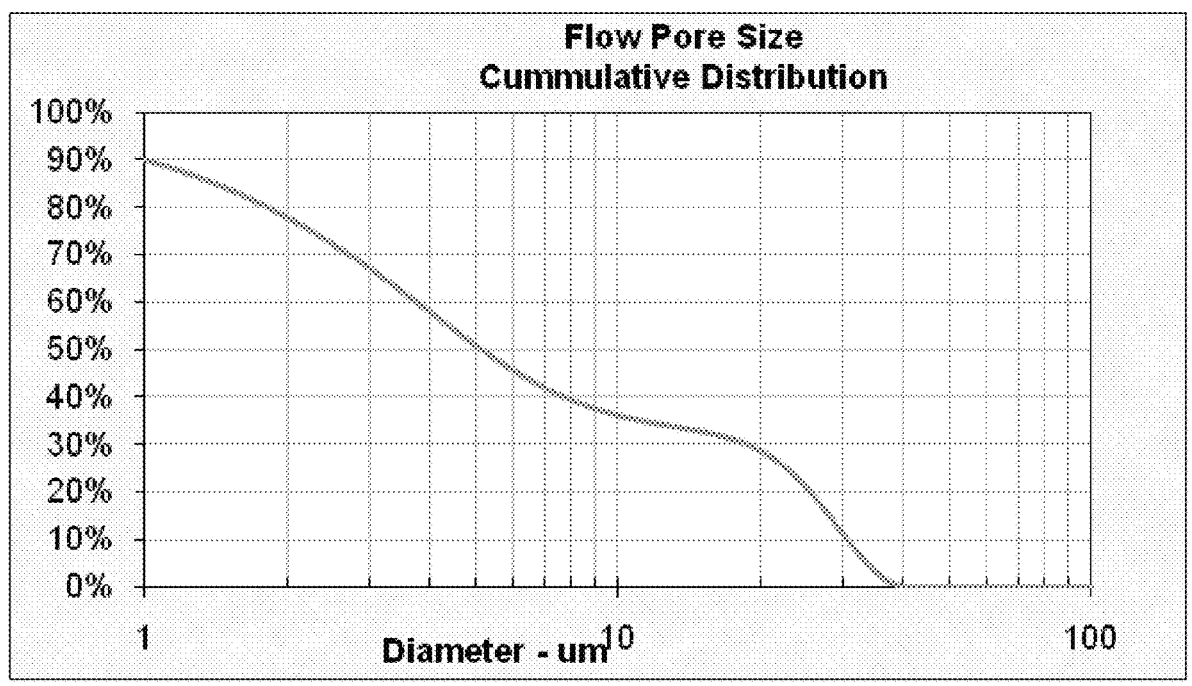
FIG. 5 is a graph of cumulative pore size distribution to show mean flow pore size for a media.

Further metrics by which the properties of the media associated with sequestering FDPs (and optionally other similar fuel contaminant products) are described relates to the pore structures of the media. In general, it is possible to characterize the properties of a porous media in terms of such parameters as mean flow pore, mode flow pore, and max flow pore. The "mode pore size" is the most frequently occurring pore size in a material. FIG. 4 shows Flow Pore Size Density Distribution of an example media material made in accordance with the present invention. The "mode pore size" (indicated by the arrow) is shown as the highest peak of the curve. "Mean pore size" is the average size of the pores in the material, and "cumulative flow pore size" is a measure of the total percentage of flow that passes through the media as a function of pore diameter, determined using a capillary flow porometer instrument. "Mean flow pore size" is defined as the pore size where 50% of cumulative flow passes through the media. "Porosity" is defined as the amount of void space in a material. FIG. 5 shows Flow Pore Size Cumulative Distribution. The "mean flow pore size" (indicated by the arrow) is the point at which the curve intersects 50% on the y-axis.

With regard to pore size, the portion of the filter media primarily responsible for removal of FDPs and related contaminants will typically have a mean flow pore size of 5 to 20 microns, or 5 to 10 microns. Suitable mean flow pore sizes include less than 20 microns less than 15 microns, and less than 10 microns. The portion of the filter media primarily responsible for removal of FDPs and related contaminants will typically have a mode flow pore size of from 10 to 50 microns, from 20 to 40 microns, or from 25 to 35 microns. Suitable mode flow pore sizes include, for example, greater than 10, greater than 15, greater than 20 and greater than 25 microns. With regard to max flow pore size, the portion of the filter media primarily responsible for removal of FDPs and related contaminants will often have a max flow pore size greater than that of cellulose or melt blown media. Suitable max flow pore sizes include greater than 10 microns, preferably, greater than 20 microns, and in some implementations greater than 30 microns. In example implementations the max flow pore size is from 20 to 50 microns, or from 25 to 45 microns.

Typically, the mode pore size is larger in the upstream portion than in the downstream portion of the filter media, and the mean (or average) pore size is smaller in the upstream portion than in the downstream portion. In accordance with the teachings of the present invention, it is desirable in general to have at least a portion of the media with small mean flow pores, while also having a large max flow pore. The ratio of max pore size to mean flow pore is often at least 2.5, optionally at least 5.0, and in some implementations greater than 7.5. In certain embodiments, where the mean flow pore is very small and the max flow pore relatively high, this ratio may be greater than 10, and optionally greater than 12.5 or 15. High numbers reflect a wider particle size distribution, which can provide for improved removal of FDP (and related) contaminants.

Additional Resins and Fibers

Binder resins can be used to help bond the media fiber, and optionally the binder fiber, into a mechanically stable media layer. Such thermoplastic binder resin materials can be used as a dry powder or solvent system, but are typically aqueous dispersions of vinyl thermoplastic resins. A resinous binder component is not necessary to obtain adequate strength for the medias of this invention, but can be used.

Resins include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins.

Suitable materials for the water soluble or dispersible binder polymer are water soluble or water dispersible thermosetting resins such as acrylic resins. methacrylic resins, polyamide resins, epoxy resins, phenolic resins, polyureas, polyurethanes, melamine formaldehyde resins, polyesters and alkyd resins, generally, and specifically, water soluble acrylic resins, methacrylic resins, and polyamide resins. Such liquid binders are typically dispersions of platelets which coat the fiber and promote adhesion of fiber to fiber in the final non-woven matrix. Sufficient resin is added to the furnish to fully coat the fiber without causing film over of the pores formed in the sheet, media, or filter material. The resin can be added to the furnish or can be applied to the media after formation.

A latex binder used to bind together the three-dimensional non-woven fiber web in each non-woven layer, or used as the additional adhesive, can be selected from various latex adhesives known in the art. The skilled artisan can select the particular latex adhesive depending upon the type of cellulosic fibers that are to be bound. The latex adhesive may be applied by known techniques such as spraying or foaming. Generally, latex adhesives having from 15 to 25% solids are used. The dispersion can be made by dispersing the fibers and then adding the binder material or dispersing the binder material and then adding the fibers. The dispersion can, also, be made by combining a dispersion of fibers with a dispersion of the binder material. The concentration of total fibers in the dispersion can range from 0.01 to 5 or 0.005 to 2 weight percent based on the total weight of the dispersion. The concentration of binder material in the dispersion can range from 10 to 50 weight percent based on the total weight of the fibers.

The media layer for removal of FDPs and similar fuel contaminant products can contain secondary fibers made from a number of both hydrophilic, hydrophobic, oleophilic, and oleophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials. One type of secondary fiber is a binder fiber that cooperates with other components to bind the materials into a sheet. Another type of secondary fiber is a structural fiber that cooperates with other components to increase the tensile and burst strength of the materials in dry and wet conditions. Additionally, the binder fiber can include fibers made from such polymers as polyvinyl chloride and polyvinyl alcohol. Secondary fibers can also include inorganic fibers such as carbon/graphite fiber, metal fiber, ceramic fiber and combinations thereof.

Secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

Production of Filter Media

In making the media of the invention, in certain embodiments a fiber mat is formed using either wet or dry processing. The mat is heated to melt thermoplastic materials to form the media by internally adhering the fibers. The bicomponent fiber used in the media of the invention permits the fiber to fuse into a mechanically stable media. The bicomponent fiber having a thermally bonding exterior sheath causes the bicomponent fiber to bind with other fibers in the media layer.

The media layer or layers for sequestering of FDPs and similar fuel contaminant products are typically made using papermaking processes. However, the media can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, and remove the fluid aqueous components to form a wet sheet.

In example wet laid processing, the media is made from an aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto a screen or other perforated support retaining the dispersed solids and passing the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the thermoplastic fiber, resin or other portion of the formed material. The melt material binds the component into a layer.

A fiber slurry containing the materials is typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. Once sufficiently dried and processed to filtration media, the sheets are typically about 0.25 to 1.9 millimeter in thickness, having a basis weight of about 20 to 200 or 30 to 150 g-m$^{-2}$. For a commercial scale process, the bicomponent mats of the invention are generally processed through the use of paper-making-type machines such as commercially available Fourdrinier, wire cylinder, Stevens Former, Roto Former, Inver Former, Venti Former, and inclined Delta Former machines.

In some implementations an inclined Delta Former machine is utilized. A bicomponent mat of the invention can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bicomponent web. The web can then be coated with a binder by conventional means, e.g., by a flood and extract method and passed through a drying section which dries the mat and cures the binder, and thermally bonds the sheet, media, or filter. The resulting mat may be collected in a large roll for future processing, for laminating to a second media material (such as a layer of cellulose media), or for forming into filter elements.

B. Configurations Containing Multiple Layers or Multiple Functional Areas

As noted above, the upstream filter material selected for sequestering FDPs (containing media fiber and binder fiber, such as glass fiber and bicomponent fiber) is often combined with a downstream filter material. This downstream filter material is generally selected for favorable removal of particulate contaminants. The downstream portion may comprise, for example, cellulose. The difference between the ability of the upstream portion and downstream portion to attract various contaminants, combined with the pore size distribution of the upstream and downstream portions, allow the filter media of the present invention to effectively remove a range of contaminants without premature plugging the filter.

The upstream (for example, bicomponent fiber and glass fiber) portion of the media typically has a smaller mean flow pore size than the downstream (for example, cellulose) portion, but this smaller average pore size is often combined with a larger mode pore size on the upstream portion, which can be useful for improving filter loading with certain contaminants, in particular fuel degradation products. Typically, the mode (or most common) pore size is larger in the upstream portion than in the downstream portion, and the mean (or average) pore size is smaller in the upstream portion than in the downstream portion.

The upstream portion may also have its own pore size variance, characterized at least by different pore sizes at different depths of the upstream portion. On the "top" of the upstream portion, the mode pore size is optionally increased. For some media, the downstream mode pore size of the upstream portion is significantly greater than the mode pore size of the downstream portion, which is typically cellulose. In some embodiments, the mode pore size of the upstream portion is greater than the mode pore size of the downstream portion. For example, the mode pore size of the upstream portion may be at least 20 percent greater than the mode pore size of the downstream portion in some implementations, and at last 40 percent greater than the mode pore size of the downstream portion in other implementations.

In an example embodiment, the mode pore size of the upstream portion is at least 20 percent greater than the mode pore size of the downstream portion; and the mean flow pore size of the upstream portion is less than 90 percent of the mean pore flow size of the downstream portion. It will be appreciated that the downstream portion may contain fiber having an average diameter or cross-section greater than the average diameter of the media fiber in the upstream portion. In some embodiments, the mode pore size of the upstream portion is greater than the mode pore size of the downstream portion. For example, the mode pore size of the upstream portion may be at least 40 percent greater or at least 60 percent greater than the mode pore size of the downstream portion. In some embodiments, the mean flow pore size of the upstream portion is less than the mean pore flow size of the downstream portion. For example, the mean flow pore size of the upstream portion may be less than 70 percent or less than 50 percent of the mean pore flow size of the downstream portion.

Media fiber diameter may also be selected to improve performance between the upstream and downstream portions. In one embodiment, the upstream portion contains media fiber having an average diameter of less than 10 microns based upon total fiber count; and the downstream portion contains media fiber having an average diameter different than the diameter of the media fiber in the upstream portion. In one embodiment, the media fiber of the upstream portion has an average diameter of less than 5 microns. Generally, the downstream portion contains fiber having an average diameter or cross-section greater than the average diameter of the media fiber in the upstream portion. The upstream portion may comprise, for example, glass fiber, binder fiber, or bicomponent fiber. In some embodiments, the downstream portion comprises cellulose, polymeric fibers such as polyester, or a combination thereof.

In one embodiment, the upstream portion contains media fiber having an average diameter of less than 10 microns based upon total fiber count; and the downstream portion contains media fiber having an average diameter different than the average diameter of the media fiber in the upstream portion; wherein the mode pore size of the upstream portion is at least 20 percent greater than the mode pore size of the downstream portion; and wherein the mean flow pore size of the media in the upstream portion is less than 90 percent of the mean pore flow size of the media in the downstream portion.

In some embodiments, the filter for filtering liquids comprises an upstream portion comprising media having a porosity of at least 50 percent, the media comprising a media fiber and a binder fiber having an average diameter greater than the media fiber; and a downstream portion comprising cellulose. The upstream portion may comprise carbon or glass fiber. In one embodiment, the media fiber of the upstream portion has an average diameter of less than 5 microns. In another embodiment, the media fiber of the upstream portion has an average diameter of less than 15 microns. In some embodiments, the mode pore size of the upstream portion is greater than the mode pore size of the downstream portion. For example, the mode pore size of the upstream portion may be at least 20 percent or at least 40 percent greater than the mode pore size of the downstream portion.

In another embodiment, the invention is directed to a filter media comprising an upstream portion containing fibers selected from carbon and glass; and a downstream portion comprising cellulose; wherein the mode pore size of the upstream portion is at least 20 percent greater than the mode pore size of the downstream portion; and wherein the mean flow pore size of the upstream portion is less than 90 percent of the mean pore flow size of the downstream portion. It will be appreciated that the downstream portion may contain fiber having an average diameter greater than the average diameter of the media fiber in the upstream portion. In some embodiments, the mode pore size of the upstream portion is greater than the mode pore size of the downstream portion. For example, the mode pore size of the upstream portion may be at least 40 percent greater or at least 60 percent greater than the mode pore size of the downstream portion. In some embodiments the mean flow pore size of the upstream portion is less than the mean pore flow size of the downstream portion. For example, the mean flow pore size of the upstream portion may be less than 70 percent or 50 percent of the mean pore flow size of the downstream portion.

In some embodiments, the upstream filter portion loads fuel degradation products at a level of capture of at 50 percent greater than the downstream filter portion. In some embodiments, the first filter portion loads fuel degradation products at a level of capture of at least 100 percent greater than the second filter portion. In some embodiments, the first filter portion loads fuel degradation products at a level of capture of at least 200 percent greater than the second filter portion. The percentage may be normalized for media volume or for media surface area.

In some embodiments, low temperature crystalline polymer powder is used to laminate the synthetic and cellulose media together so as to make the composite media easily manufacturable into a number of different filter element configurations. Other methods of laminating the media layers together such as adhesive lamination or thermal bonding means are possible as well.

Figure 6A:
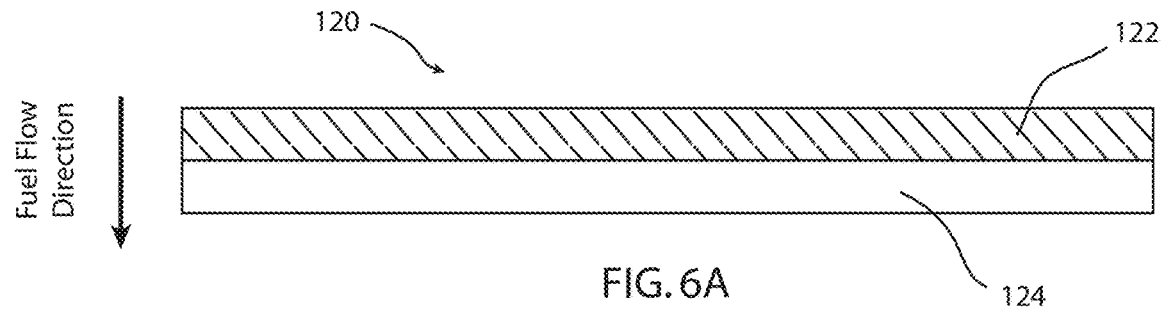
FIG. 6A is a cross sectional schematic view of a media construction made in accordance with an implementation of the invention.

In reference now to FIG. 6A to 6D, example configurations for filter media constructions are shown, In these cross sectional schematic diagrams, only the basic positioning of the media components are described, and it will be understood that these figures are not drawn to scale. It will also be understood that the figures are simplifications of the media constructions, and that they are alternative embodiments, but non-limiting as to the types of constructions possible under the present invention. FIG. 6A is a cross sectional schematic view of a media construction made in accordance with an implementation of the invention, showing a two layer construction. In this example embodiment, the media construction 120 includes a first portion containing upstream media 122 and a second portion containing downstream media 124. The upstream media can be, for example a combination of glass media fiber and bicomponent binder fiber. The downstream portion can be, for example, cellulose media.

Figure 6B:
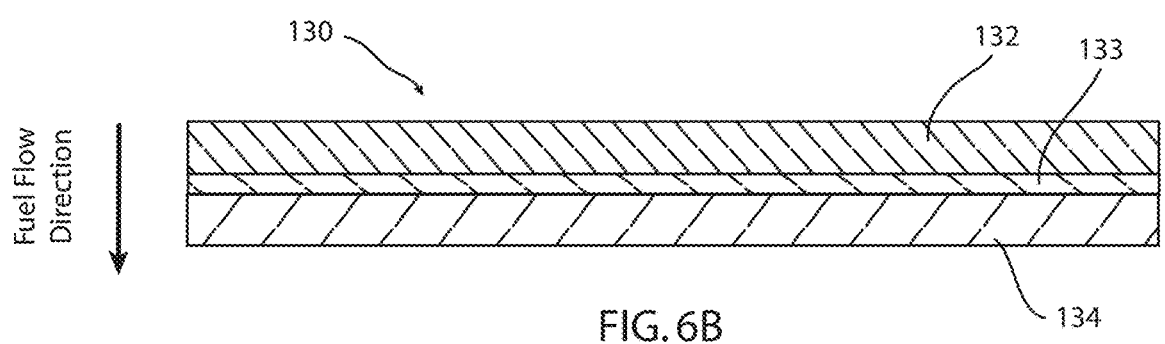
FIG. 6B is a cross sectional schematic view of a second media construction made in accordance with an implementation of the invention.

FIG. 6B is a cross sectional schematic view of another media construction made in accordance with an implementation of the invention, showing a three layer construction. In this example embodiment, the media construction 130 includes first and second portions containing upstream media 132 and 133, plus a third portion containing downstream media 134. The upstream media portions can be, for example a combination of glass media fiber and bicomponent binder fiber. In some embodiments these upstream media portions 132, 133 can have different properties from one another, such as different pore sizes and distributions. It is not necessary that both layers (or portions if not in discrete layers) remove FDPs or similar contaminants, as long as at least one layer or portion do so. The downstream portion can be, for example, cellulose media. Further embodiments can have, for example, additional upstream and downstream layers.

Figure 6C:
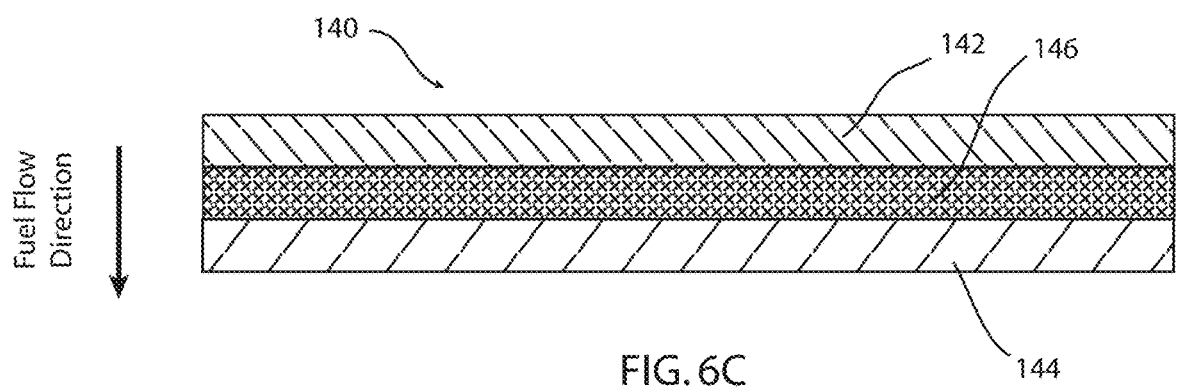
FIG. 6C is a cross sectional schematic view of a third media construction made in accordance with an implementation of the invention.

FIG. 6C is a cross sectional schematic view of a media construction made in accordance with an implementation of the invention showing a two layer construction with a spacer between media layers. In this example embodiment, the media construction 140 includes a first portion containing upstream media 142, a second portion containing downstream media 144, and a spacer 146 between the upstream and downstream portions 142, 144. The upstream media can be, for example, a combination of glass media fiber and bicomponent binder fiber. The downstream portion can be, for example, cellulose media. The spacer 146 can be, for example, a non-filtering scrim material.

Figure 6D:
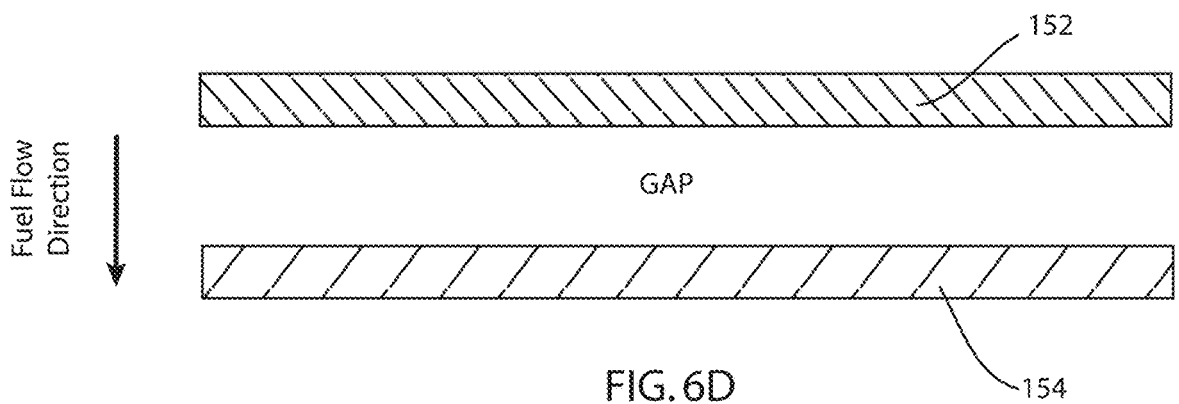
FIG. 6D is a cross sectional schematic view of a fourth media construction made in accordance with an implementation of the invention.

FIG. 6D is a cross sectional schematic view of a media construction made in accordance with an implementation of the invention wherein the upstream portion 152 and downstream portion 154 are further separated from one another by a gap. The upstream media can be, for example a combination of glass media fiber and bicomponent binder fiber. The downstream portion can be, for example, cellulose media. The gap can be relatively small, or relatively large. In this embodiment, the functional orientation of the two media is important: that one portion media be positioned upstream of the other portion. It will be understood support materials can be placed intermediate these two portions 152, 154.

Figure 7:
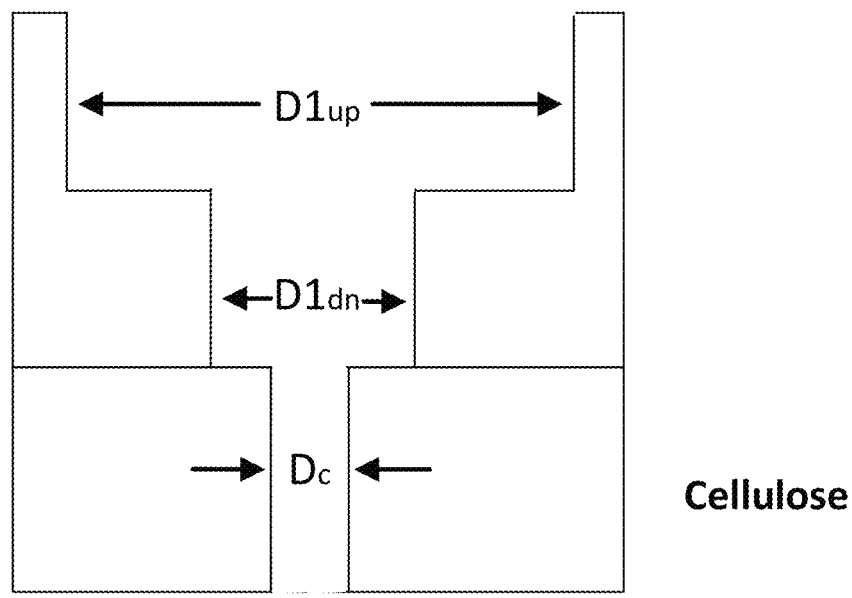
FIG. 7 is a schematic representation of a cross section of a portion of a filter structure according to one embodiment of the invention, showing relative pore sizes.

FIG. 7 illustrates the pore relationship of the media in an example embodiment of the invention, wherein the upstream portion comprises synthetic bicomponent-glass media and the downstream portion comprises cellulose. In particular, a layered structure of the present invention is shown in this example implementation, wherein the pore size can vary from wide open in the upstream portion to much smaller in the downstream portion where fine particulate filtration occurs. The upstream portion may comprise two or more layers with different pore sizes as is shown here. However, the mode pore size of the cellulose is smaller than the mode pore sizes of both portions of the depicted upstream portion.

A filter with a structure where the media pores are smaller on the downstream side than on the upstream side is often helpful. In other words, the porous structure is denser going from upstream to downstream side. As a result, the particles or contaminants to be filtered are able to penetrate to varying depths dependent on particle size. This causes the particles or contaminants to be distributed throughout the depth of the filter material, reducing the increase in pressure drop, and extending the life of the filter. In one embodiment, the pore sizes change by steps, as in FIG. 7. In another embodiment, the size of the pores gradually increases from smaller on the downstream side to larger on the upstream side.

Figure 8:
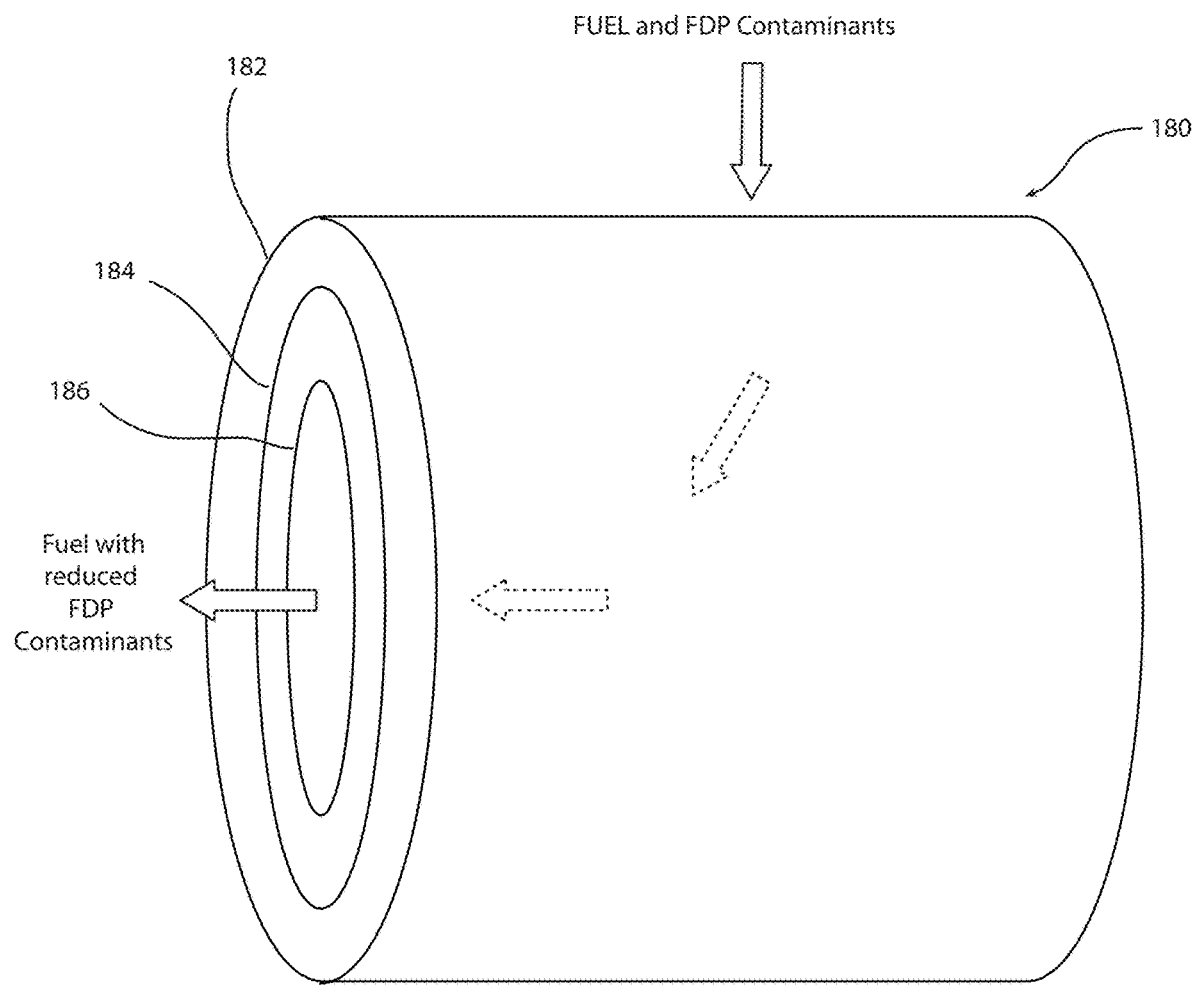
FIG. 8 is a multi-stage fuel filter according to one embodiment of the present invention.

FIG. 8 shows an example of one embodiment of a multi-stage fuel filter 180, having concentric layers of media 182, 184, 186. The concentric layers can comprise layers of media and binder fibers (such as glass and bicomponent) with varying pore dimensions from the exterior to the interior. Generally the mean flow pore size will get smaller from the outer layers 182 to the inner layers 186. FDPs and other similar products have the tendency to adsorb to the outer media surface and create a layer or film across the media. The agglomeration of the degradation products starts to fill the pores. The higher number of large pores in the upstream media allows the outer media to capture and store the degradation products without plugging as quickly. The tighter downstream layer is designed to have high efficiency for particles.

C. Experimental Data

It is possible to evaluate the filter media of the present invention on the basis of media pore structure. Media pore structure can be characterized on the basis of capillary theory of porometry. Based on molecular theory, the interaction between molecules in a pure liquid is the same throughout the liquid except for at an interface such as a gas-liquid, gas-solid, liquid-liquid, or liquid-solid. By summing over the entire pure liquid, the average of all interactions is essentially equal for each molecule, except for at these interfaces. At these interfaces the molecules typically under a "tension" due to differences in the intermolecular interactions in the bulk and at the surface. At a gas-liquid interface, the excess potential energy at the surface due to a lower density of molecules results in the surfaces being under tension, hence the term "surface tension".

A liquid that easily wets a material has a low contact angle. When the surface of a liquid meets a wettable material, for example like the wall of a glass container, the molecules are more attracted to the glass than they are to the liquid surface. This attraction to the glass surface curves the surface of the liquid upward. When the wall is curved around to form a tube, this attraction force acts around the entire circumference of the tube resulting in a net upward force on the fluid. This phenomenon has been developed into what is known as capillary theory, where there is a balance of forces between the hydrostatic head pressure of the liquid and the forces from the surface tension.

$$\sigma \pi d \cos(\theta) - \gamma(\Delta h)\left(\frac{\pi d^2}{4}\right) = 0$$

Where
$\sigma$=Surface Tension
d=Diameter of Tube
$\theta$=Contact Angle of Liquid on Surface of Tube
$\gamma$=Specfic Weight of Fluid
$\Delta h$=Fluid Dispalcement Distance in Tube For wettable fluids, the contact angle is small, and we can then assume:

$\cos(\theta) \approx 1$

Then, after substituting pressure for specific weight and liquid height, the equation can be written as:

$$d = \frac{4\sigma}{\Delta p}$$

This equation relates diameter, pressure, and surface tension and is used in the calculation of pore size in porometry testing.

There are three commonly used techniques to measure the pore sizes of a porous material. These three all use capillary theory to calculate pore sizes based on the relationship of the surface tension of a liquid, pressure, and diameter of pore. Each of the three can vary slightly on how they perform their measurements and test procedures: The first procedure, air permeability porometry, uses a non-reacting liquid that wets and fills the pores of the porous material. The saturated material is then pressurized with a non-reacting gas to remove the liquid from the pores. The smaller the pore size, the higher the pressure needed to force the liquid out of the pores. Pressure and air flow are measured until all of the liquid has been forced out of the sample. This data is then compared to pressure and flow measurements of a clean, dry sample to calculate the pore size distribution.

A second procedure, mercury intrusion porometry, uses mercury as the liquid that fills the pores of a porous material. Mercury has a very high surface tension and contact angle, and thus does not readily enter pores. This technique then uses pressure to force the mercury into the pores. The smaller the pore, the higher the pressure required to force the mercury into the pore. Mercury volume used and pressure are measured, and they are then used to calculate pore size distribution.

A third procedure, liquid extrusion porometry, uses a non-reacting fluid that fills and completely wets the pores of a porous material. The saturated material is then pressurized with a non-reacting gas to remove the liquid from the pores. The smaller the pore, the higher the pressure required to force the liquid out of the pore. The measured liquid volume that is forced out of the pores, along with pressure, are used to calculate pore size distribution.

Such pore testing can be accomplished utilizing, for example, an automated air permeability porometer manufactured by Porous Materials, Inc. As used herein, the model was APP-1200-AEXSC using CAPWIN Version 6.71.122 test software. The test procedure included capillary flow porometry, dry up/wet up using silicone fluid and a fluid surface tension of 20.1 dynes/c. The sample effective testing size had a diameter of 1.0 centimeters, with a maximum air flow of 100,000 cc/min; maximum sample differential pressure of 120 kP, and the following test machine specific testing parameters:

Porous Materials Inc. Test Parameters

|  | Dry Curve | Wet Curve |
| --- | --- | --- |
| Maxpres | 180 kPa | 180 |
| Maxflow | 100000 cc/m | 100000 cc/m |
| Bublflow | NA | 10 cc/m |
| F/PT | NA | 50 |
| minbppres | NA | 0 kPa |
| Zerotime | NA | 1 sec |
| pulse width | 0.4 sec | 0.1 sec |
| v2incr | 160 cts | 80 cts |
| Preginc | 16 cts | 4.8 cts |
| pulse delay | 2 sec | 2 sec |
| mineqtime | 30 sec | 45 sec |
| Presslew | 10 cts | 10 cts |
| Flowslew | 50 cts | 50 cts |
| eqiter | 3 sec | 20 sec |
| aveiter | 20 sec | 20 sec |
| maxpdif | 0.69 kPa | 0.69 kPa |
| maxfdif | 50 cc/m | 50 cc/m |

To calculate the pore size distribution from the data, you need to compare the dry sample curve to the wet sample curve. This is done by calculating the percent of air flow the wet sample has versus the dry sample. This gives what is called the filter flow percentage . . . .

$$Q(p) = \frac{\text{Wet Sample Air } Flow_p}{\text{Dry Sample Air } Flow_p}$$

This filter flow percentage is a function of pressure. So, next we use the equation from capillary theory (Equ 2.3) to substitute diameter for pressure. Now we get a flow base pore size distribution curve from 0-100% . . . .

$$D(d) = Q\left(\frac{4\sigma}{d}\right) = Q(p)$$

The type of calculations used for pore size distribution in manufacture's reporting software can magnify the variability of measured data, and can give uneven distribution curves. Furthermore, the pore size distribution results are a collection of data points, and thus difficult to use in comparison analysis techniques as well as modeling techniques. Therefore, Donaldson Company has developed a proprietary technique to curve fit the raw data collected from each test. This technique is able to curve-fit the data into a distribution format, without having to restrict it into a classical normal distribution curve.

The results of this technique give:

g(d)=A cumulative distribution function of the diameter of the pore sizes of the tested sample.

G(d)=A density distribution function of the diameter of the pore sizes of the tested sample.

Figure 9:
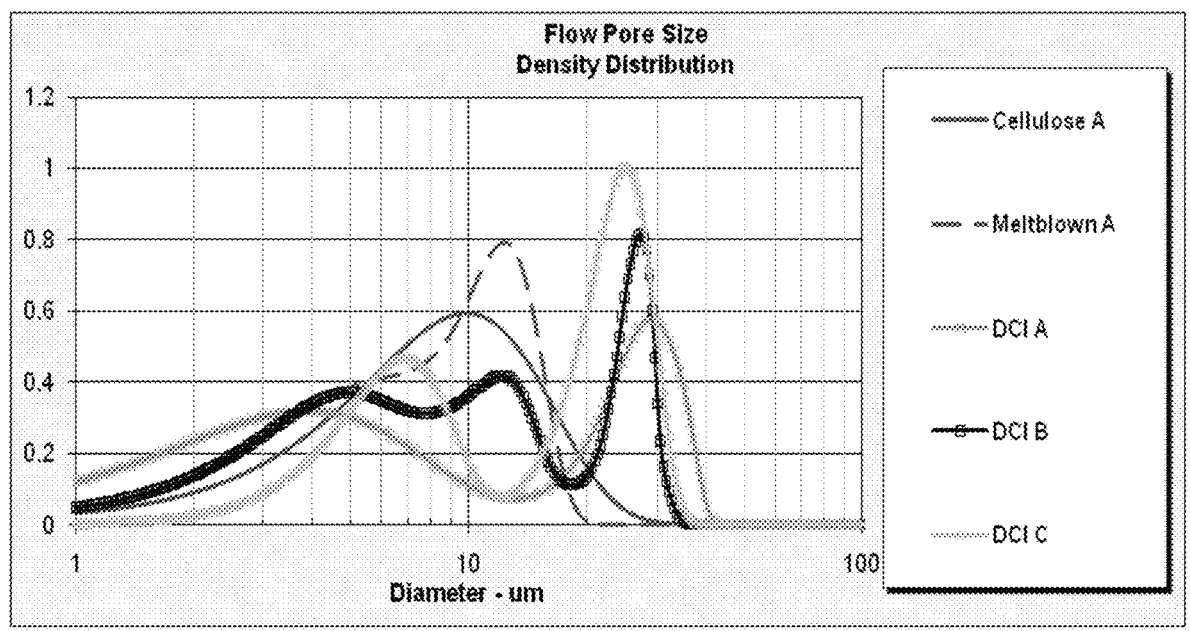
FIG. 9 is a graph of pore density versus diameter comparing melt blown, cellulose, and bicomponent-glass media.

FIG. 9 shows a graph of flow pore size density distribution comparing different meltblown, cellulose, and bicomponent-glass fuel media. As evidenced by the mode pore size distributions for pore diameters on the downstream side of the upstream layer on FIG. 9, the example bicomponent-glass has a mode pore size of almost 30 µm versus approximately 13 µm for the melt blown media. In relating the upstream bicomponent-glass and melt blown layers to the cellulose layer, the peak mode pore size of almost 30 µm for the bicomponent-glass is much greater than the cellulose. It can also be seen from FIG. 9 that the melt blown media with a mode pore size density of approximately 13 µm is very similar to the cellulose with a mode pore size density of 10 µm.

Mode pore size is one measure of media pore structure. Another measure of media pore structure is mean flow pore size, which is defined as the pore size where 50% of cumulative flow passes through the media.

Figure 10:
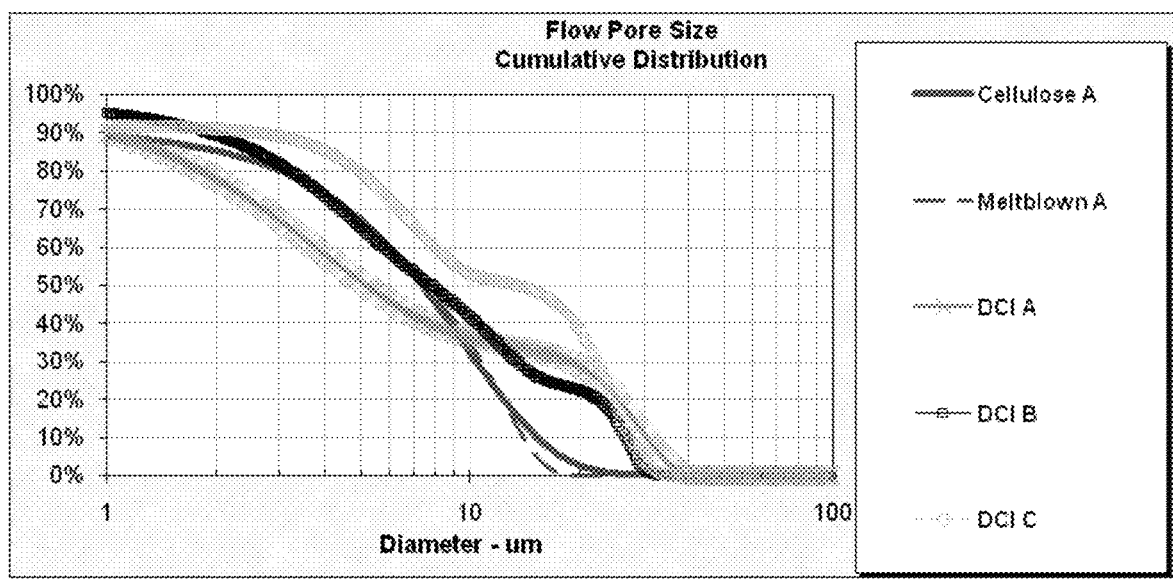
FIG. 10 is a graph of cumulative pore size distribution comparing melt blown, cellulose, and bicomponent-glass media.

FIG. 10 shows the cumulative pore size distribution for the components of the melt blown, cellulose and bicomponent-glass media.

The materials used to produce the data shown in FIG. 10 were as follows:

Cellulose A: Commercial cellulose media, Ahlstrom media grade 15PS-11

Meltblown A: Commercial meltblown-cellulose composite media, Ahlstrom media grade 15 PS LFF-1.

DCI A: Bicomponent polyester-glass media layer with a mean flow pore size of 30.3 microns laminated to bicomponent polyester-glass media layer with a mean flow pore size of 9.2 microns.

DCI B: Bicomponent polyester-glass media layer with a mean flow pore size of 20.1 microns laminated to bicomponent polyester-glass media layer with a mean flow pore size of 9.3 microns.

DCI C: Bicomponent polyester-glass media layer with a mean flow pore size of 30.3 microns laminated to $2^{nd}$ bicomponent polyester-glass media layer with a mean flow pore size of 20.1 microns.

Diesel fuel sediment was created through the oxygenation of electron rich molecules similar to the methods outlined in the following references: Frankenfeld, J. W.; Taylor, W. F.; Brinkman, D. W., et al, Ind. Eng. Chem. Prod. Res. Dev., 1983, 22, 608-614; K. T. Reddy, J. Propulsion, Vol 5(1), 1989, pgs 6-13; John W. Frankenfeld, William F. Taylor, Dennis W. Brinkman, Industrial & Engineering Chemistry Product Research and Development 1983 22 (4), 622-627; John W. Frankenfeld, William F. Taylor, Dennis W. Brinkman, Industrial & Engineering Chemistry Product Research and Development 1983 22 (4), 615-621; John W. Frankenfeld, William F. Taylor, Industrial & Engineering Chemistry Product Research and Development 1980 19 (1), 65-70; and W. F. Taylor and J. W. Frankenfeld, Ind. Eng. Chem. Prod. Res. Dev., Vol 17 (1), 1978, pgs 86-90. These references reveal that similar sediments (or deposits) to that found in diesel fuels can be produced in a laboratory environment.

It can be seen that the embodiment of the 10 μm bicomponent-glass media layer has a mean flow pore size that is smaller than the cellulose media layer despite having mode pore size that is almost three times that of the cellulose. The significant number of large pores is further evidenced on the cumulative size distribution in FIG. 10 by looking at the 30% flow pore size. For the three samples of bicomponent-glass media, approximately 30%, 23%, and 39%, respectively, of the total flow goes through pores of 20 μm or larger, while the 30% cumulative flow pore size for the melt blown media and for cellulose is approximately half this size.

In summarizing the pore size relationships between the synthetic bicomponent, melt blown, and three cellulose media samples the following ratios can be calculated, shown in Table 1.

TABLE 1

| Media Composite | Mean Flow Pore Ratio | 30% Flow Pore Size Ratio | Mode Pore Size Ratio |
|---|---|---|---|
| Meltblown/Cellulose | 1.0 | 1.0 | 1.3 |
| DCI A/Cellulose | 0.7 | 2.0 | 2.9 |
| DCI B/Cellulose | 1.1 | 1.1 | 2.8 |
| DCI C/Cellulose | 1.8 | 2.0 | 2.4 |

Another aspect of the bicomponent-glass-cellulose media embodiment relative to melt blown-cellulose media is the compressive modulus. Table 2 shows the percentage of compression for identical diameter and thickness samples of synthetic and melt blown media under identical loads.

The materials used to produce the data shown in Table 2 were as follows:

MB-1: Commercial meltblown media currently used in Hollingsworth and Vose media grade TR108802.

MB-2: Commercial meltblown media currently used in Ahlstrom media grade 15 PS LFF-1.

DCI-1: Bicomponent polyester-glass media with a mean flow pore size of 9.2 microns.

DCI-2: Bicomponent polyester-glass media with a mean flow pore size of 9.3 microns.

DCI-3: Bicomponent polyester-glass media with a mean flow pore size of 30.3 microns.

DCI-4: Bicomponent polyester-glass media with a mean flow pore size of 20.1 microns.

TABLE 2

| Media | Test # | Sample # | Force (g) | Distance (mm) | Dis./Sam. (mm) | Avg (mm) | Stdev (mm) | % Compressed |
|---|---|---|---|---|---|---|---|---|
| MB-1 | 1 | 25 | 4836.85 | 11.412 | 0.456 | | | |
| MB-1 | 2 | 25 | 4837.27 | 11.106 | 0.444 | 0.451 | 0.006 | 43.6% |
| MB-1 | 3 | 25 | 4830.19 | 11.343 | 0.454 | | | |
| DCI-1 | 1 | 45 | 4833.58 | 12.565 | 0.279 | | | |
| DCI-1 | 2 | 45 | 4822.68 | 12.671 | 0.282 | 0.280 | 0.002 | 37.0% |
| DCI-1 | 3 | 45 | 4830.99 | 12.539 | 0.279 | | | |
| MB-2 | 1 | 30 | 4831.33 | 13.253 | 0.442 | | | |
| MB-2 | 2 | 30 | 4838.54 | 13.413 | 0.447 | 0.441 | 0.007 | 33.9% |
| MB-2 | 3 | 30 | 4827.83 | 12.982 | 0.433 | | | |
| DCI-2 | 1 | 45 | 4834.25 | 14.402 | 0.320 | | | |
| DCI-2 | 2 | 45 | 4839.55 | 14.235 | 0.316 | 0.319 | 0.002 | 28.2% |
| DCI-2 | 3 | 45 | 4830.37 | 14.439 | 0.321 | | | |
| DCI-3 | 1 | 35 | 4825.99 | 14.623 | 0.418 | | | |
| DCI-3 | 2 | 35 | 4840.50 | 14.762 | 0.422 | 0.418 | 0.003 | 26.8% |
| DCI-3 | 3 | 35 | 4839.13 | 14.551 | 0.416 | | | |
| DCI-4 | 1 | 40 | 4831.39 | 15.111 | 0.378 | | | |
| DCI-4 | 2 | 40 | 4833.31 | 14.931 | 0.373 | 0.377 | 0.003 | 24.7% |
| DCI-4 | 3 | 40 | 4837.15 | 15.145 | 0.379 | | | |

It can be seen that synthetic media compression ranges from 24.6-37.0% compared to the melt blow media compression of 43.6%. In the specific case of the preferred embodiment, the two media layers that comprise bicomponent-glass (DCI-1 and DCI-3) have values of 26.8 and 37.0%. Compressive modulus is an important point when dealing with fuel contaminants that collect somewhat on the upstream side of fuel filtration media and at interfaces between graded layers. Even a small amount of localized contaminant collection on the upstream side of a media layer can result in a localized pressure increase in the upstream section, which compresses the media, thereby reducing the media void volume and resulting in short service life.

Figure 11A:
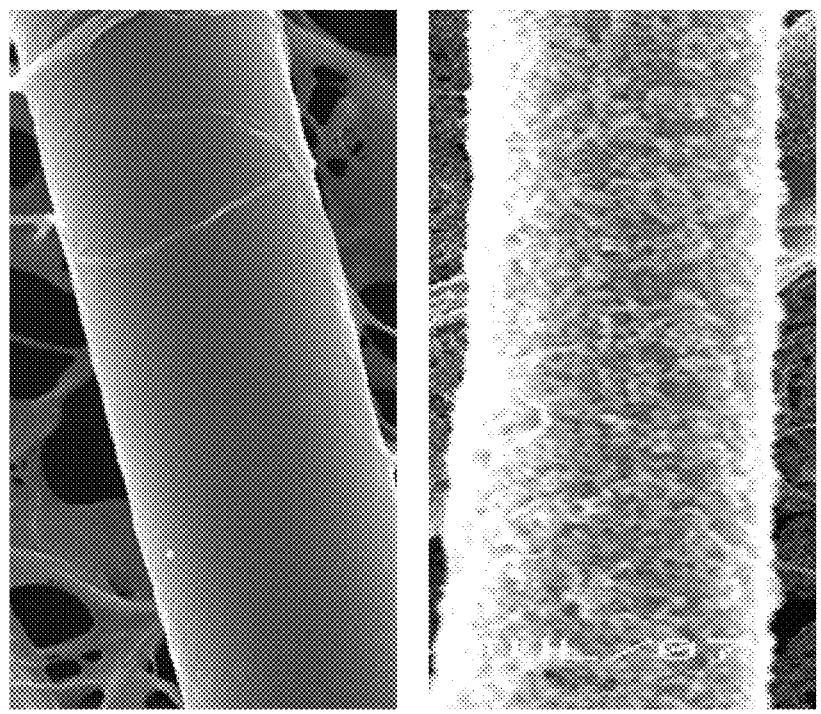
FIG. 11A shows two scanning electron microscope images of filter media before and after fuel filtration, the filter media comprising bicomponent-glass media.
Figure 11B:
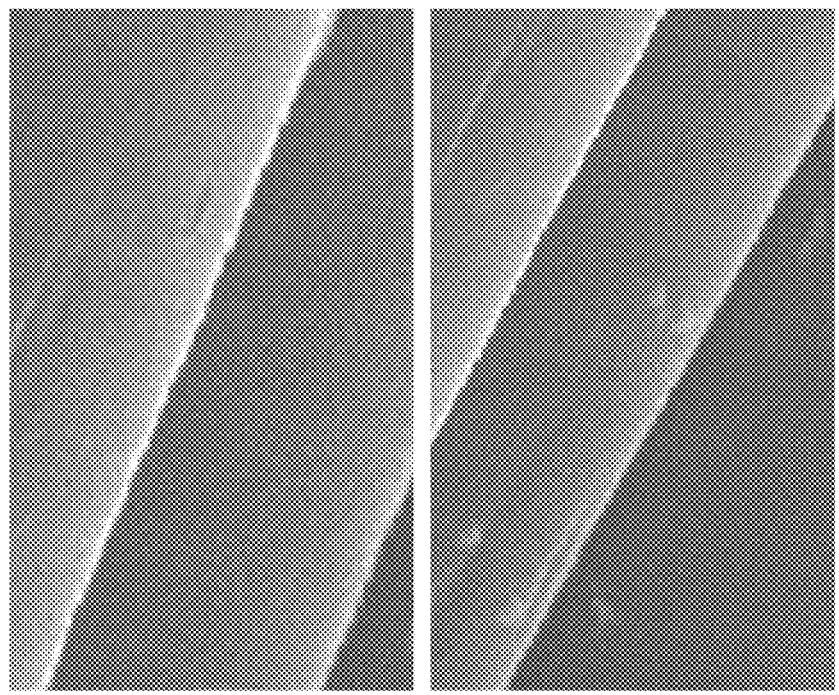
FIG. 11B shows two scanning electron microscope images of filter media before and after fuel filtration, the filter media comprising cellulose media positioned downstream from bicomponent-glass media.

FIG. 11A shows scanning electron microscope images of upstream portion fibers before (left) and after (right) fuel filtration. FIG. 11B shows scanning electron microscope images of downstream portion fibers before (left) and after (right) fuel filtration. The two fibers shown in FIGS. 11A and 11B are of similar size but different chemistries. Formation of FDP layers on the upstream portion fiber is shown, while only a few FDPs have been adsorbed on the downstream portion fiber.

Thus, the difference in attraction to various contaminants between the upstream portion and downstream portion, along with the pore size distribution, allows the filter media of the present invention to effectively remove contaminants without plugging the filter. The upstream portion may comprise glass fiber, binder fiber, bicomponent fiber, or a combination of materials. The downstream portion may, for example, comprise cellulose.

Although the filter media may be designed using distinct layers or stages, it is by no means limited to multiple layered structures. In some embodiments, the filter media comprises a continuous gradient filter structure. This gradient may have a smooth continuous variation in the properties, or it can be designed with accelerated changes in the property gradient. This gradient can also be designed with discontinuous steps. In some such implementations the entire filter media across the gradient filter structure my serve to remove FDPs and related contaminants. However, in other implementations only a portion of such media will effectively remove FDPs and related contaminants, depending upon media materials and structures.

In some embodiments, the upstream portion contains media fiber having an average diameter of less than 10 microns based upon total fiber count; and the downstream portion contains media fiber having an average diameter different than the average diameter of the media fiber in the upstream portion. Generally, the downstream portion contains fiber having an average diameter greater than the average diameter of the media fiber in the upstream portion. In other embodiments, the upstream and downstream portions of the filter media are integrally formed.

Evaluation of prior art fuel filtration media with fuel based contaminants revealed performance deficiencies (shortened service life due to plugging) caused by limitations in the melt blown media layer(s). The deficiencies revealed were related to the pore sizes of the melt blown material relative to the cellulose and the pore size distributions of the melt blown material. Solidity and compressibility of the melt blown layer are also limitations of the prior art versus the bicomponent-glass and cellulose media layers of the present invention. The bicomponent-glass/cellulose media embodiment displayed performance advantages over the prior art filtration media in field applications where the primary fouling contaminants are constituents of a hydrocarbon fluid chemistry that form deformable particles.

Prior art filtration development has focused around the use of standardized industry contaminants (test dusts). Standard test dust is made up of rigid non-deformable particles, which, other than for random electrostatic charges, have little attraction to the filter fibers and display little or no adhesion to the fiber surfaces which they collect on. Although these test dusts may mimic airborne contaminants that ingress into fluid systems or wear debris from the internal system components, they are not representative of the contaminants responsible for the majority of filter fouling in a number of applications, such as diesel fuel filtration, particularly in ultra-low sulfur diesel fuels and diesel fuels containing biodiesels. This is borne out by the fact that higher dust capacity in lab tests do not always correlate to longer field service life.

Figure 12:
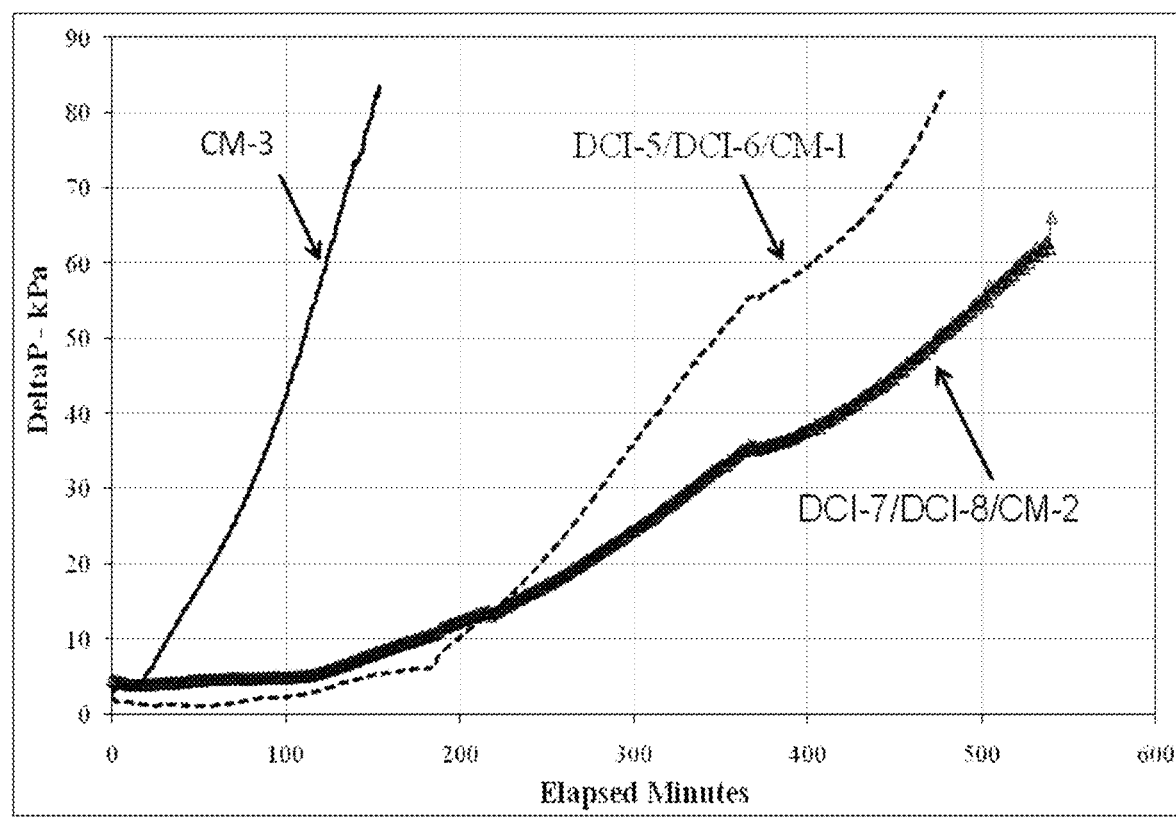
FIG. 12 is a graph showing comparative life testing using laboratory-generated fuel contaminants.

FIG. 12 shows comparative life testing using laboratory-generated fuel contaminants. In particular, the performance advantage displayed is longer service life in actual application while maintaining equal filtration efficiency. For the tests, lab-generated FDP contaminants were present at a concentration of 150 mg/L. The test fuel was then pumped through the filter materials at a linear flow rate of 0.48 mm/sec in a multipass loop at a temperature of 22° C. The pressure drop across the filter was measured, and the test was stopped when the pressure drop reached 80 kPa. Additional contaminant was added to the fuel at 180 minutes if the pressure drop across the sample did not reach 80 kPa after 180 minutes. Lab-generated FDP contaminant properties such as molecular weight, size, etc. will vary with the type of fuel used as well as with the particular batch of fuel used. Based on calibrations the concentration of FDPs from the difference in absorbance is approximately 150 mg/L calculated as the difference in the two absorbance values and an FDP calibration curve, and 150 mg/L was the concentration the lab-generated FDP contaminants for testing purposes. The materials used to produce the data shown in FIG. 12 were as follows:

CM-1: Commercial cellulose media, Ahlstrom media grade 15PS-11.

CM-2: Commercial cellulose media, Ahlstrom media grade 5 PS-1.

CM-3: Commercial meltblown-cellulose composite media, Ahlstrom media grade 15 PS LFF-1.

DCI-5: 34-gsm Bicomponent polyester-glass media, 0.18 mm thickness, 125 cfm permeability.

DCI-6: 38-gsm Bicomponent polyester-glass media, 0.20 mm thickness, 80 cfm permeability.

DCI-7: 46-gsm Bicomponent polyester-glass media, 0.30 mm thickness, 190 cfm permeability.

DCI-8: 62-gsm Bicomponent polyester-glass media, 0.30 mm thickness, 50 cfm permeability.

Thus, when compared to media of the prior art, the structures and materials disclosed in the preferred and alternative embodiments have been found to be particularly effective in providing significantly longer field service life while maintaining equal filtration efficiency.

Figure 13:
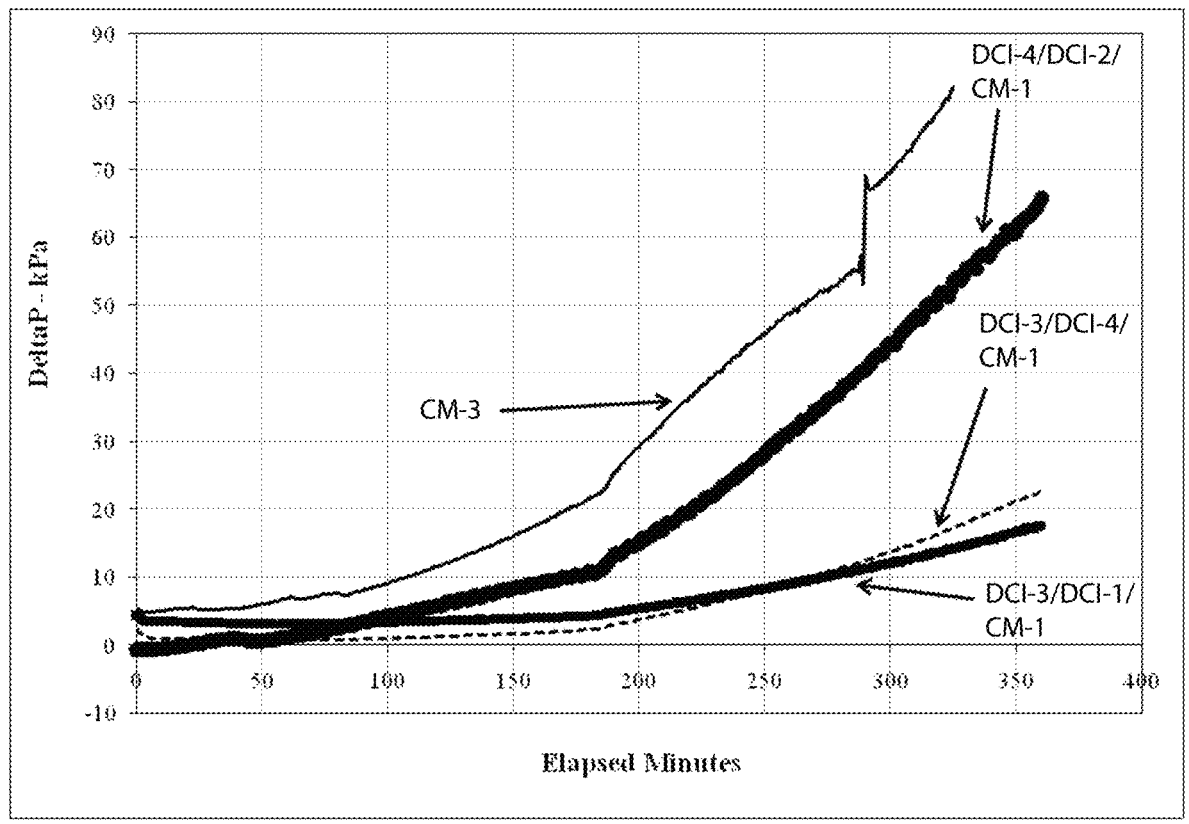
FIG. 13 is a graph showing comparative life testing of various filter media of the present invention and prior art.

FIG. 13 further shows comparative life testing of certain embodiments of the present inventions as compared to prior art melt blown-cellulose media.

The materials used to produce the data shown in FIG. 13 were as follows:

CM-1: Commercial cellulose media, Ahlstrom media grade 15PS-11.

CM-3: Commercial meltblown-cellulose composite media, Ahlstrom media grade 15PS LFF-1.

DCI-1: Bicomponent polyester-glass media with a mean flow pore size of 9.2 microns.

DCI-2: Bicomponent polyester-glass media with a mean flow pore size of 9.3 microns.

DCI-3: Bicomponent polyester-glass media with a mean flow pore size of 30.3 microns.

DCI-4: Bicomponent polyester-glass media with a mean flow pore size of 20.1 microns.

As shown in FIGS. 12 and 13, over time the embodiments of the present invention have a significantly lower pressure drop increase, correlating with less plugging and longer service life. Thus, the filter media of the present invention provides longer service life without compromising filter efficiency or increasing filter size.

The potential performance advantage of bicomponent-glass media in fine filtration applications (typically below 10 μm) is well understood in the filtration industry. Less significant performance advantages in coarser applications (above 10 μm) have historically been demonstrated when evaluating bicomponent-glass filtration media versus melt-blown media with the traditional contaminants used in filter development (i.e. test dust). The historical performance bias for glass media in fine filtration applications has much of its basis in the smaller diameter of the glass fibers versus meltblown media and the additional void volume thereby provided in the media. See Table 3 for a comparison of meltblown and bicomponent-glass media solidity. In fine filtration applications the smaller diameter of the glass fibers vs. meltblown produces a larger percentage increase in void volume than in coarse applications where larger glass fibers must be incorporated into the media in order to achieve the targeted efficiency and physical properties.

TABLE 3

| Material | Basis Wt (g/m$^2$) | Thickness (mm) | Density Material 1 (g/cm$^3$) | Density Material 2 (g/cm$^3$) | % Material 1 | % Material 2 | Composite Density (g/cm$^3$) | Solidity |
|---|---|---|---|---|---|---|---|---|
| CM-1 | 150 | 0.50 | — | — | | | | |
| MB-2 | 55 | 0.29 | 1.4 | — | 100 | — | 1.4 | 0.14 |
| DCI-3/ DCI-1 | 88 | 0.56 | 1.4 | 2.6 | 69 | 31 | 1.8 | 0.09 |
| DCI-4/ DCI-2 | 75 | 0.48 | 1.4 | 2.6 | 58 | 42 | 1.9 | 0.08 |

TABLE 3-continued

| Material | Basis Wt (g/m²) | Thickness (mm) | Density Material 1 (g/cm³) | Density Material 2 (g/cm³) | % Material 1 | % Material 2 | Composite Density (g/cm³) | Solidity |
|---|---|---|---|---|---|---|---|---|
| DCI-3/ DCI-4 | 78 | 0.50 | 1.4 | 2.6 | 50 | 50 | 2.0 | 0.08 |

The use of bicomponent-glass media in the prior art often requires a screen support which is cost-prohibitive in many of the markets in which this invention would find utilization. Although the cellulose layer in this invention can serve as a cost-effective support layer, the inventors surprisingly found that the composite media's ability to remove contaminants with less increase in pressure drop while maintaining particulate efficiency was a function of the relative pore size(s) of the bicomponent-glass vs. cellulose layers and the composition of the media.

In an alternative embodiment, the upstream media contains no glass fibers. Polymeric fibers of similar size and concentrations replace the glass fibers in the previous synthetic bicomponent-glass layer(s) without significantly altering the structure and physical properties of the upstream media.

Another alternative embodiment utilizes traditional resin bonded glass media in place of the bicomponent-glass media. As with the bicomponent-glass media embodiment, exacting design of the media pore structure and gradient in the graded structure glass media along with the compressive modulus of the glass media are key to achieving very long service life.

It will be appreciated that, although the implementation of the invention described above is directed to the removal of FDPs from fuel streams, such as the fuel tanks of diesel engines or bulk storage tanks, the present device may be used in other filter applications and is not limited to the removal of FDPs. Embodiments of this invention would also be suitable for removing numerous contaminants of a hydrocarbon fluid chemistry that include such contaminants as waxes, asphaltenes, sterol glucosides, steryl glucosides, sterol glycosides and fuel degradation products. The contaminants can comprise, for example, deformable particles, non-deformable particles, and mixtures of deformable and non-deformable particles. Hydrocarbons such as lube and hydraulic oil may also be filtered using the present invention.

While the present invention has been described with reference to several particular implementations, those skilled in the art will recognize that many changes may be made hereto without departing from the spirit and scope of the present invention.

We claim:

1. A filter for filtering liquid fuels, the filter comprising:
   filter media configured and arranged for placement in a liquid fuel stream, the filter media comprising:
   an upstream media layer and a downstream media layer, the upstream media layer comprising:
   a) media fiber; and
   b) binder fiber having an average diameter greater than the media fiber;
   wherein:
   the media fiber has an average diameter of 0.1 to 20 microns;
   the downstream media layer has a mean pore size greater than the upstream media layer;
   the upstream media layer has a max flow pore size at least 2.5 times greater than its mean flow pore size; and
   wherein the filter is configured so that upon exposure to a fuel stream containing fuel degradation products, the fuel degradation products are primarily retained in the upstream media layer and wherein upon exposure to a fuel stream containing particulate contaminants, the particulate contaminants are primarily retained in the downstream media layer.

2. The filter for filtering liquid fuels of claim 1, wherein the media fiber comprises glass fiber.

3. The filter for filtering liquid fuels of claim 1, wherein the media fiber comprises carbon fiber.

4. The filter for filtering liquid fuels of claim 1, wherein the binder fiber comprises bicomponent fiber.

5. The filter for filtering liquid fuels of claim 1, wherein the media fiber has an average diameter of less than 5 microns.

6. The filter for filtering liquid fuels of claim 1, wherein the binder fiber has an average diameter greater than 5 microns.

7. The filter for filtering liquids of claim 1, wherein the filter media has a solidity of less than 12 percent.

8. The filter for filtering liquids of claim 1, wherein the filter media has a solidity of less than 10 percent.

9. The filter for filtering liquids of claim 1, wherein the filter media has a solidity of less than 9 percent.

10. The filter for filtering liquids of claim 1, wherein the filter media has a solidity of less than 8 percent.

11. The filter for filtering liquid fuels of claim 1, wherein the filter media has a compressibility of less than 40 percent at a pressure of 1.24 kg/cm².

12. The filter for filtering liquid fuels of claim 1, wherein the filter media has a compressibility of less than 20 percent at a pressure of 1.24 kg/cm².

13. The filter for filtering liquid fuels of claim 1, wherein the filter media has a compressibility of less than 10 percent at a pressure of 1.24 kg/cm².

14. The filter for filtering liquid fuels of claim 1, wherein the filter media has a mean flow pore of less than 15 microns.

15. The filter for filtering liquid fuels of claim 1, wherein the filter media has a mode flow pore of at least 20 microns.

16. The filter for filtering liquid fuels of claim 1, wherein the filter media has an upstream portion and a downstream portion, and wherein the upstream portion has a pore size mode greater than the pore size mode of the downstream portion.

17. The filter for filtering liquid fuels of claim 1, further comprising a second filter media, the second filter media comprising cellulose fibers, and the second filter media positioned downstream from the filter media comprising a media fiber and a binder fiber.

18. A filter for filtering liquid fuels, the filter comprising:
   filter media configured and arranged for placement in a liquid fuel stream, the filter media comprising:

an upstream media layer and a downstream media layer, the upstream media layer comprising:
a) media fiber; and
b) binder fiber having an average diameter greater than the media fiber;
wherein the filter media has a solidity of less than 12 percent, and a compressibility of less than 40 percent at a pressure of 1.24 kg/cm$^2$;
wherein:
the media fiber has an average diameter of 0.1 to 20 microns;
the upstream media layer has a max flow pore size at least 2.5 five times greater than its mean flow pore size; and
wherein the filter is configured so that upon exposure to a fuel stream containing fuel degradation products, the fuel degradation products are primarily retained in the upstream media layer and wherein upon exposure to a fuel stream containing particulate contaminants, the particulate contaminants are primarily retained in the downstream media layer.

19. The filter for filtering liquid fuels of claim 18, wherein the media fiber comprises glass fiber.

* * * * *